(12) United States Patent
Kovie et al.

(10) Patent No.: US 11,840,127 B2
(45) Date of Patent: Dec. 12, 2023

(54) VEHICLE BODY STRUCTURE

(71) Applicant: NISSAN NORTH AMERICA, INC., Franklin, TN (US)

(72) Inventors: David Kovie, Livonia, MI (US); Mahiuddin Ahmed, Troy, MI (US); Christopher Herrala, Milford, MI (US); David Iozzo, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 120 days.

(21) Appl. No.: 17/491,469

(22) Filed: Sep. 30, 2021

(65) Prior Publication Data
US 2023/0101929 A1  Mar. 30, 2023

(51) Int. Cl.
*B60J 5/04* (2006.01)
*E05B 77/04* (2014.01)

(52) U.S. Cl.
CPC ............ *B60J 5/0425* (2013.01); *E05B 77/04* (2013.01)

(58) Field of Classification Search
CPC .............................. B60J 5/0433; B60J 5/0425
USPC ....................................................... 296/146.6
See application file for complete search history.

(56) References Cited

U.S. PATENT DOCUMENTS

| 4,090,734 | A | * | 5/1978 | Inami | B60J 5/0447 296/146.6 |
| 4,684,166 | A | * | 8/1987 | Kanodia | B60J 5/0447 296/30 |
| 6,817,652 | B2 | * | 11/2004 | Graber | B60J 5/0447 296/187.02 |
| 2012/0036785 | A1 | * | 2/2012 | Bedekar | E05B 77/04 49/394 |

* cited by examiner

*Primary Examiner* — Joseph D. Pape
(74) *Attorney, Agent, or Firm* — Global IP Counselors, LLP

(57) ABSTRACT

A vehicle body structure includes a reinforcement member, a latch mechanism and a secondary reinforcement portion. The reinforcement member is installed to an inner door panel of a door structure and extends from a forward area of the door structure to a rearward area of the door structure. The latch mechanism is installed to the rearward area of the inner door panel and is positioned such that a section of a rearward portion of the reinforcement member is outboard and level with a portion of the latch mechanism. The secondary reinforcement portion is fixedly attached to a central area of the reinforcement member spaced apart from a forward area of the inner door panel. In response to an impact event where force is directed to a central area of the door structure, the reinforcement member deforms and contacts the latch mechanism retaining the latch mechanism in the latching orientation.

14 Claims, 17 Drawing Sheets

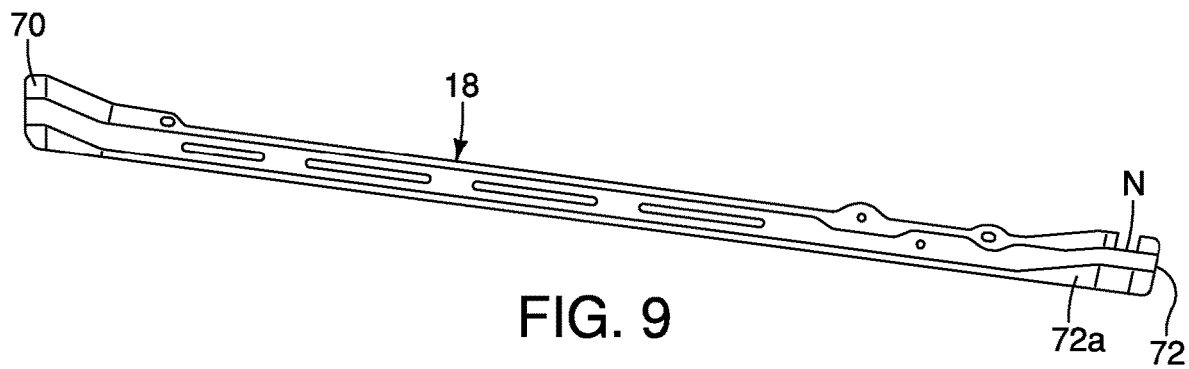
FIG. 9
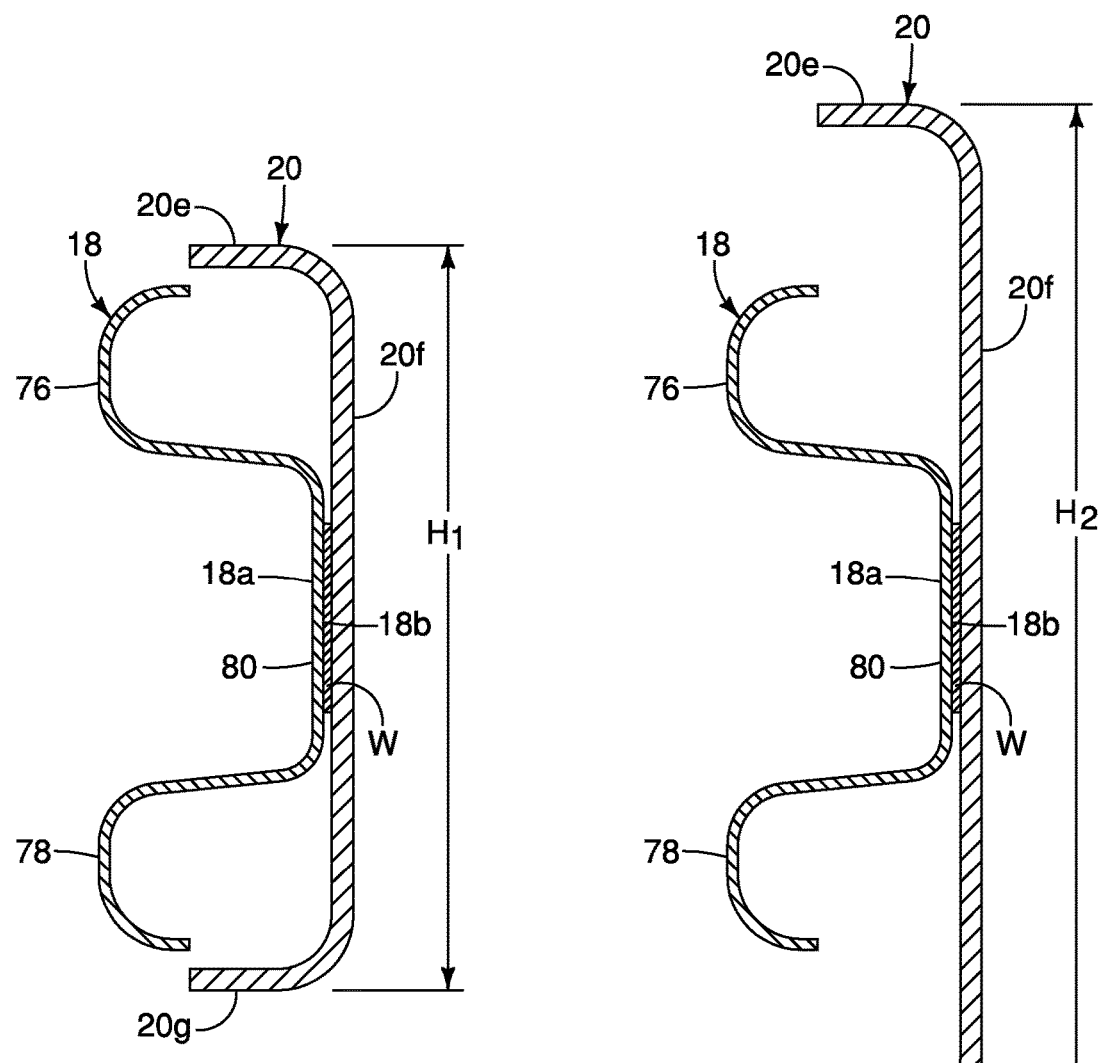
FIG. 10
FIG. 11

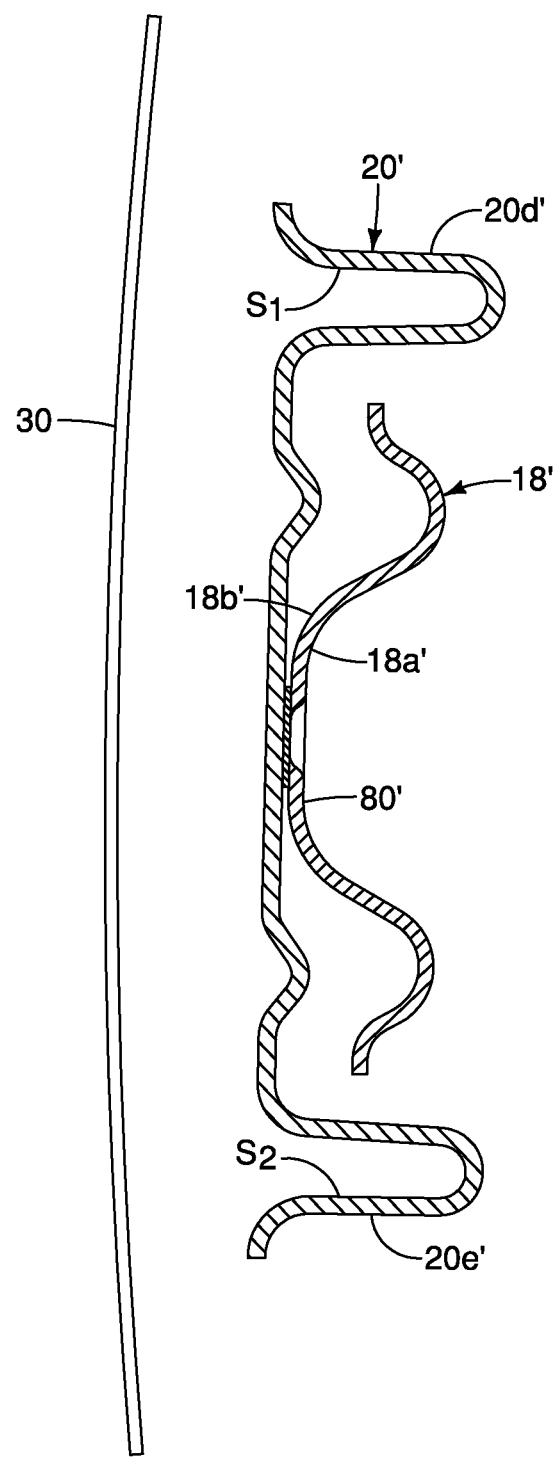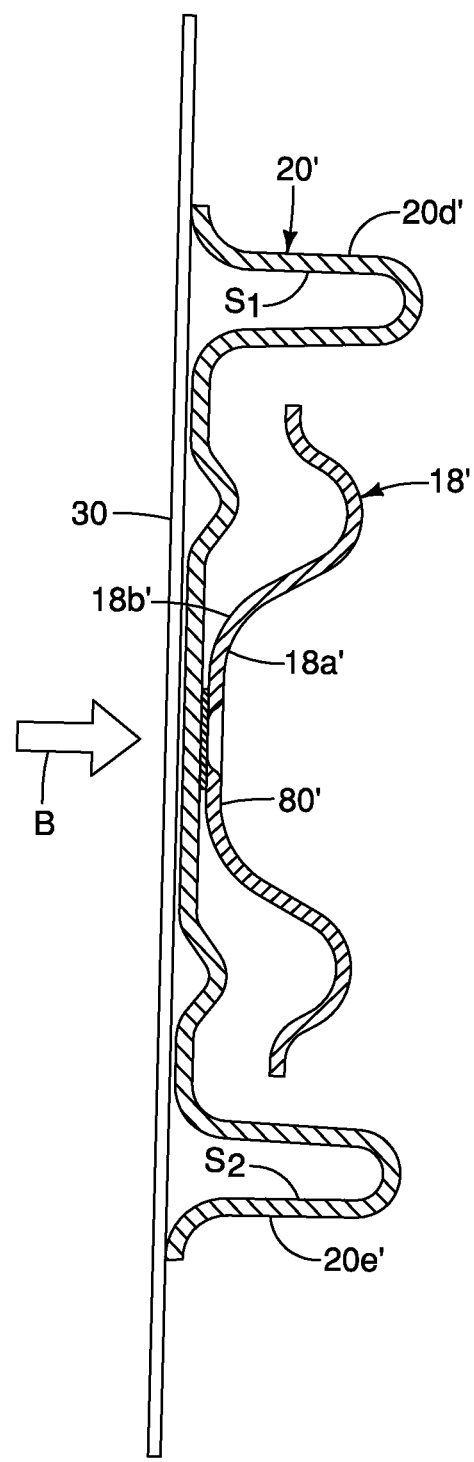
FIG. 27
FIG. 28

VEHICLE BODY STRUCTURE

BACKGROUND

Technical Field

The present disclosure generally relates to a vehicle body structure. More specifically, the present disclosure relates to a vehicle body structure with a door that includes a reinforcement member and an attenuation member (a secondary reinforcement portion) that are configured to direct deformation of the reinforcement member during an impact event near a central area of the door to prevent a door latch mechanism from operating such that the door remains in a closed orientation during the impact event.

Background Information

Vehicle body structures, such as doors are provided with reinforcement members and latch mechanisms. In response to an impact event, a door of the vehicle can sometimes open.

SUMMARY

One object of the present disclosure is to provide a structure within a door that prevents a latch mechanism from operating so that the latch mechanism can continue retaining the door in a closed orientation during an impact event where the impact event applies impact force proximate a central area of the door.

Another object of the present disclosure is to provide a door with structure that prevents the door from opening during an impact event such that impacting force against the door can at least partially be transmitted to a B-pillar of a vehicle.

In view of the state of the known technology, one aspect of the present disclosure is to provide a vehicle body structure with a door structure, a latch mechanism and a secondary reinforcement portion. The door structure has an inner door panel and a reinforcement member installed to the inner door panel. The reinforcement member extends from a forward area of the door structure to a rearward area of the door structure. The door structure is movable to and from each of a closed orientation and an open orientation when installed to a vehicle. The latch mechanism is installed to the rearward area of the inner door panel. The latch mechanism is configured such that in a latching orientation the latch mechanism retains the door structure in the closed orientation and in a release orientation the door structure can move to the open orientation. The latch mechanism is positioned such that at least a section of a rearward portion of the reinforcement member is outboard and level with a portion of the latch mechanism. The secondary reinforcement portion is fixedly attached to a central area of the reinforcement member spaced apart from a forward area of the inner door panel such that in response to an impact event where force is directed to a central area of the door structure, the reinforcement member deforms and contacts the latch mechanism retaining the latch mechanism in the latching orientation.

BRIEF DESCRIPTION OF THE DRAWINGS

Referring now to the attached drawings which form a part of this original disclosure:

FIG. 9 is a side view of the reinforcement member similar to FIG. 8 with the secondary reinforcement member removed in accordance with the first embodiment;

FIG. 10 is a cross-sectional view of the reinforcement member and the secondary reinforcement member taken along the line 10-10 in FIG. 8 showing the shapes of the forward portions of each of the reinforcement member and the secondary reinforcement member in accordance with the first embodiment;

FIG. 11 is a cross-sectional view of the reinforcement member and the secondary reinforcement member taken along the line 11-11 in FIG. 8 showing the shape rearward portions of each of the reinforcement member and the secondary reinforcement member in accordance with the first embodiment;

FIG. 27 is a cross-section of a portion of the door showing the outer door panel, the reinforcement member and the secondary reinforcement member in the at rest state depicted in FIG. 25 in accordance with the second embodiment;

FIG. 28 is another cross-section of the portion of the door shown in FIG. 27 showing the outer door panel, the reinforcement member and the secondary reinforcement member during or after an impact event as depicted in FIG. 26 showing the outer door panel contacting the secondary reinforcement member covering slots formed in the secondary reinforcement member defining small beams therewith for greater rigidity in accordance with the second embodiment;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
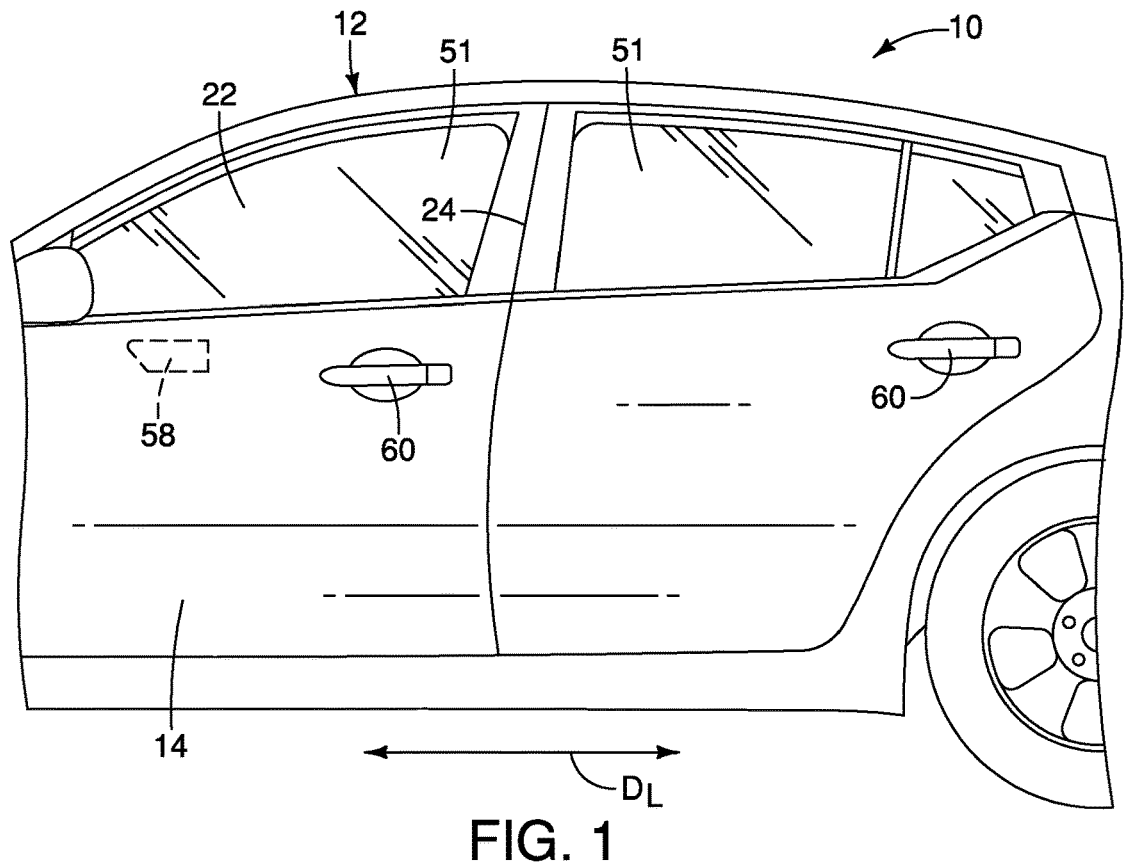
FIG. 1 is a side view of a vehicle that includes a door structure with a reinforcement member showing the door structure in a closed orientation in accordance with a first embodiment.
Figure 2:
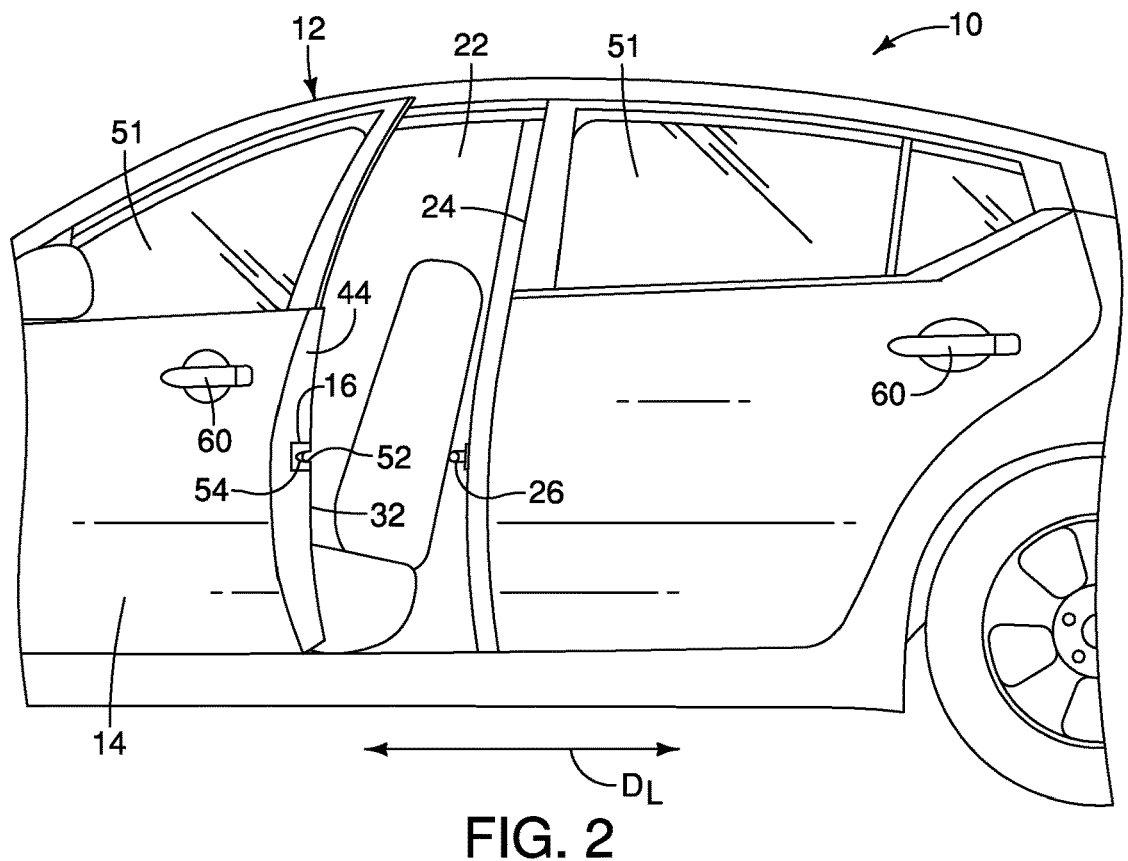
FIG. 2 is another side view of the vehicle showing the door structure in an open orientation in accordance with the first embodiment.

Referring initially to FIGS. 1 and 2, a vehicle 10 is illustrated in accordance with a first embodiment that includes a vehicle body structure 12 that includes a door 14 with a door latch mechanism 16 (FIGS. 2-7) and a reinforcement member 18 (FIGS. 3-11). The reinforcement member 18 is provided with an attenuation member 20 (FIGS. 3-8 and 10-11) attached to the reinforcement member 18 at a predetermined location such that in response to an impact event where impact energy applies sufficient force on a central exterior area of the door 14 deforming the door 14, the reinforcement member 18 also deforms and moves contacting a portion of the latch mechanism 16 thereby preventing the latch mechanism 16 from operating, as described in greater detail below.

The vehicle body structure 12, among other features, defines a passenger compartment 22 and a door opening 24 that provides access to the passenger compartment 22. The door 14 (also referred to as the door structure 14) is movable to and from each of a closed orientation (FIG. 1) and an open orientation (FIG. 2). As shown in FIG. 2, the vehicle body structure 12 further includes a latch striker 26 that is attached to, for example, the B-pillar of the vehicle body structure 12.

Figure 4:
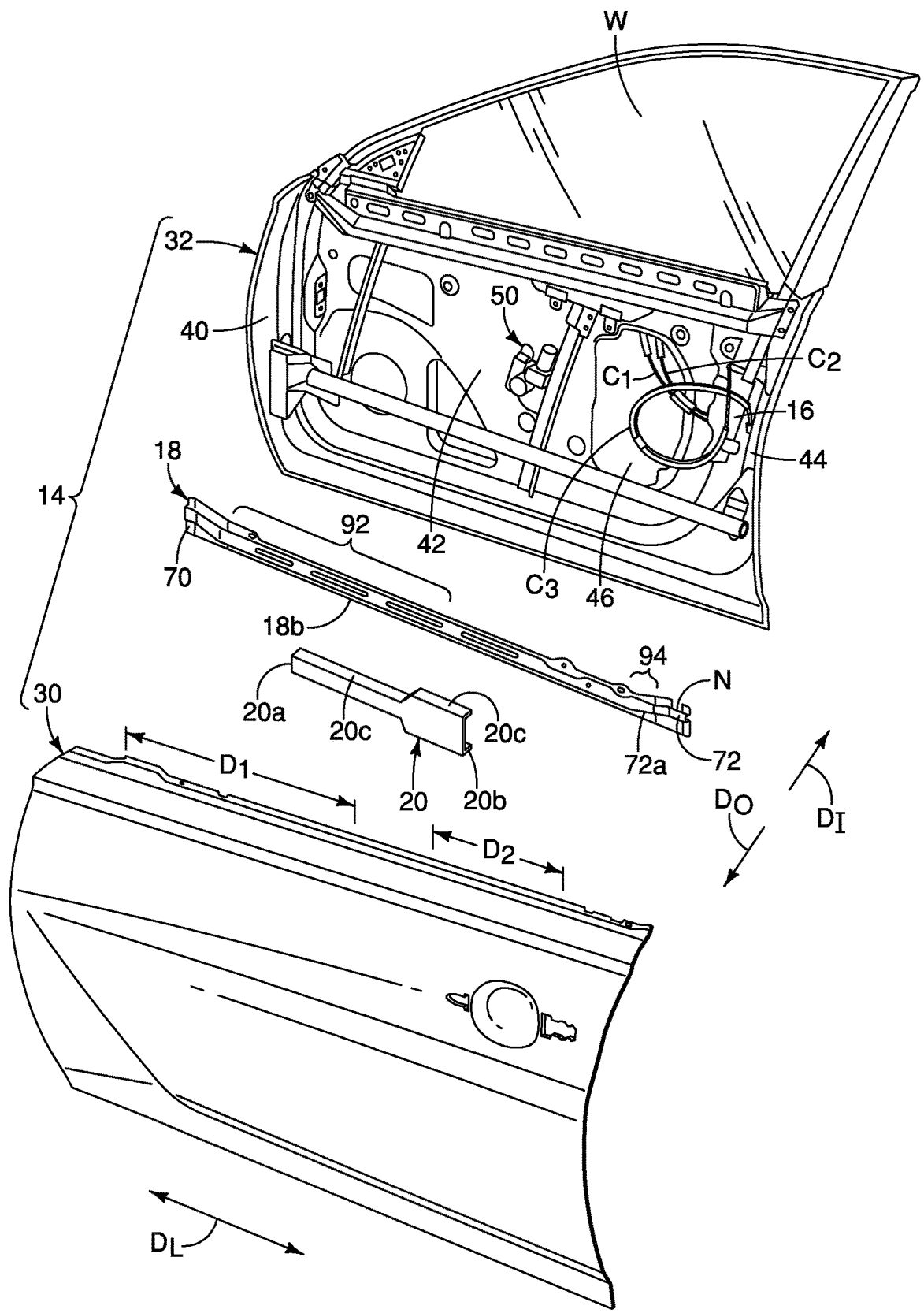
FIG. 4 is an exploded perspective view of the door structure showing the outer panel, an inner panel, the latch mechanism and the reinforcement member in accordance with the first embodiment.

The vehicle body structure 12 defines a vehicle longitudinal direction, as shown in FIGS. 1, 2 and 4. The vehicle body structure 12 also defines vehicle inboard direction $D_1$ and vehicle outboard directions $D_O$ (only one of each shown in various drawings, such as FIG. 4) that are defined relative to a lengthwise center line (not shown) of the vehicle 10.

Figure 3:
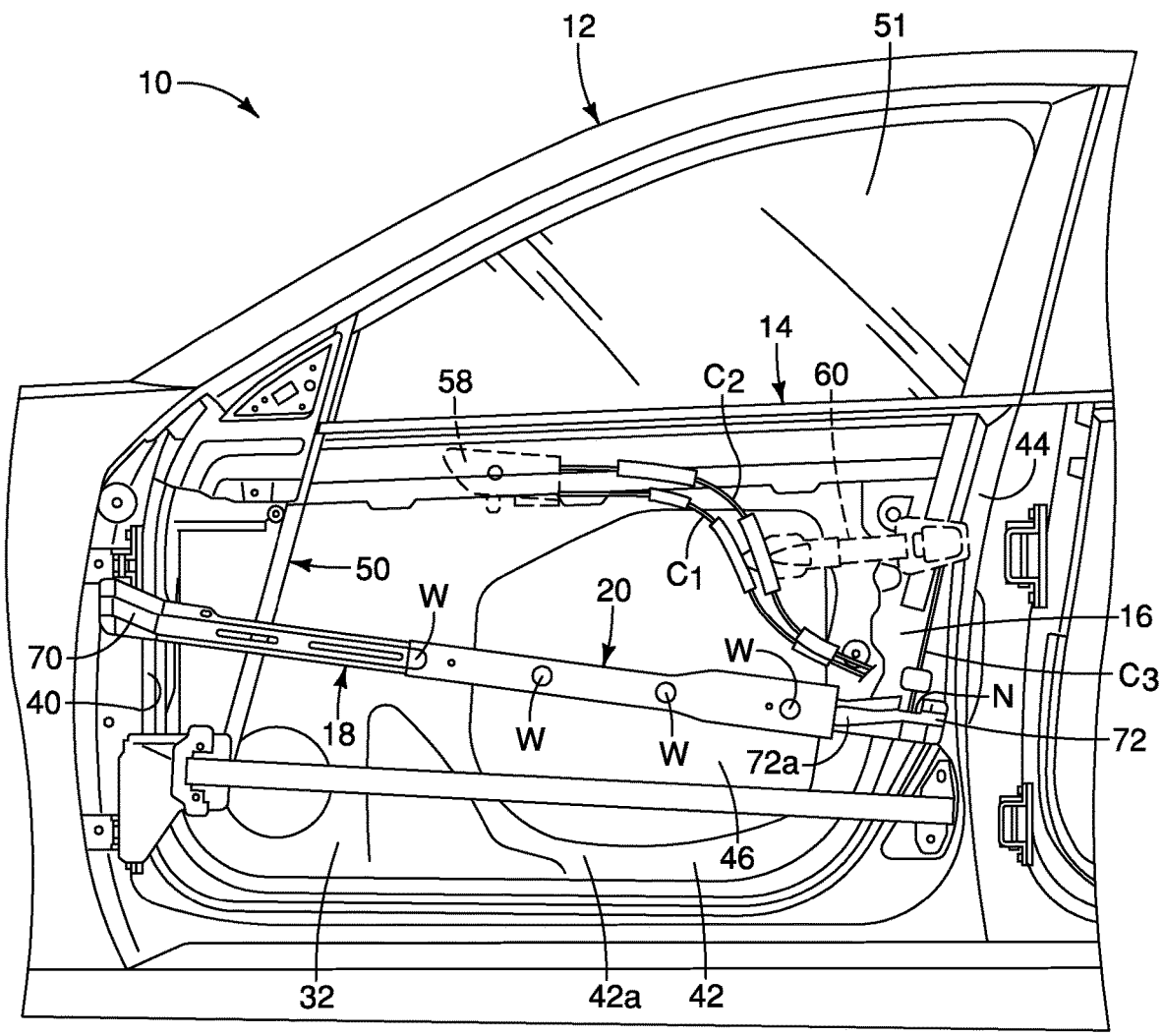
FIG. 3 is yet another side view of the vehicle with an outer panel of the door structure removed showing a latch mechanism and the reinforcement member in accordance with the first embodiment.

As shown in FIGS. 3 and 4, the door 14 includes, among other features, an outer panel 30 (FIG. 4), an inner panel 32, the door latch mechanism 16 (also referred to as the latch mechanism 16) and the reinforcement member 18. The outer panel 30 (also referred to as the outer door panel 34) has an outer periphery defining forward, rearward and bottom edges that are welded or otherwise fixedly attached to corresponding peripheral portions of an outer periphery of the inner panel 32 (also referred to as the inner door panel 32).

As shown in FIGS. 3-4, the inner panel 32 has a forward portion 40, a main wall 42 (an inboard wall) and a rearward portion 44. The forward portion 40 extends vertically along a forward end of the main wall 42. The rearward portion 44 extends vertically along a rearward end of the main wall 42. The forward portion 40 extends in an outboard direction and the rearward portion 44 extend away from the main wall 42 thereby defining a recessed area 46 along an outboard side 42a of the main wall 42 between the rearward portion 44 and the forward portion 40. With the outer door panel 34 attached to the inner door panel 36, the recessed area 46 defines a hollow interior of the door 14.

The door 14 includes a window regulator 50 that is at least partially disposed within the recessed area 46 of the inner door panel 36. The window regulator 50 includes a glass window 51 that is movable up from within the recessed area 46 through a gap between the upper edges of the outer panel 30 and the inner panel 32. The window regulator 50 is positioned between the main wall 42 of the inner door panel 36 and the reinforcement member 18. Since vehicle window regulators and operation of window regulators are conventional features of a vehicle, further description is omitted for the sake of brevity.

As shown in FIGS. 3-4, the latch mechanism 16 is installed to a rearward area of the inner door panel 32 adjacent to the rearward portion 44 of the inner door panel within the recessed area 46 (the hollow interior of the door 14). As shown in FIG. 2, the rearward portion 44 of the inner door panel 32 includes a slot 52. A portion of the latch mechanism 16 is visible in the slot 52. The latch mechanism 16 includes a latch plate 54 that pivots in a first direction to catch the latch striker 26 of the door opening 24 of the vehicle body structure 12. The latch plate 54 pivots in an opposite direction to release the latch striker 26 allowing the door 14 to open in a conventional manner. Since latch plates and latch strikers of latch mechanisms are conventional mechanical structures, further description is omitted for the sake of brevity.

The latch mechanism 16 is configured such that in a latching orientation the latch mechanism 16 retains the door 14 in the closed orientation (FIG. 1) and in a release orientation the door 14 can move to the open orientation (FIG. 2).

Figure 5:
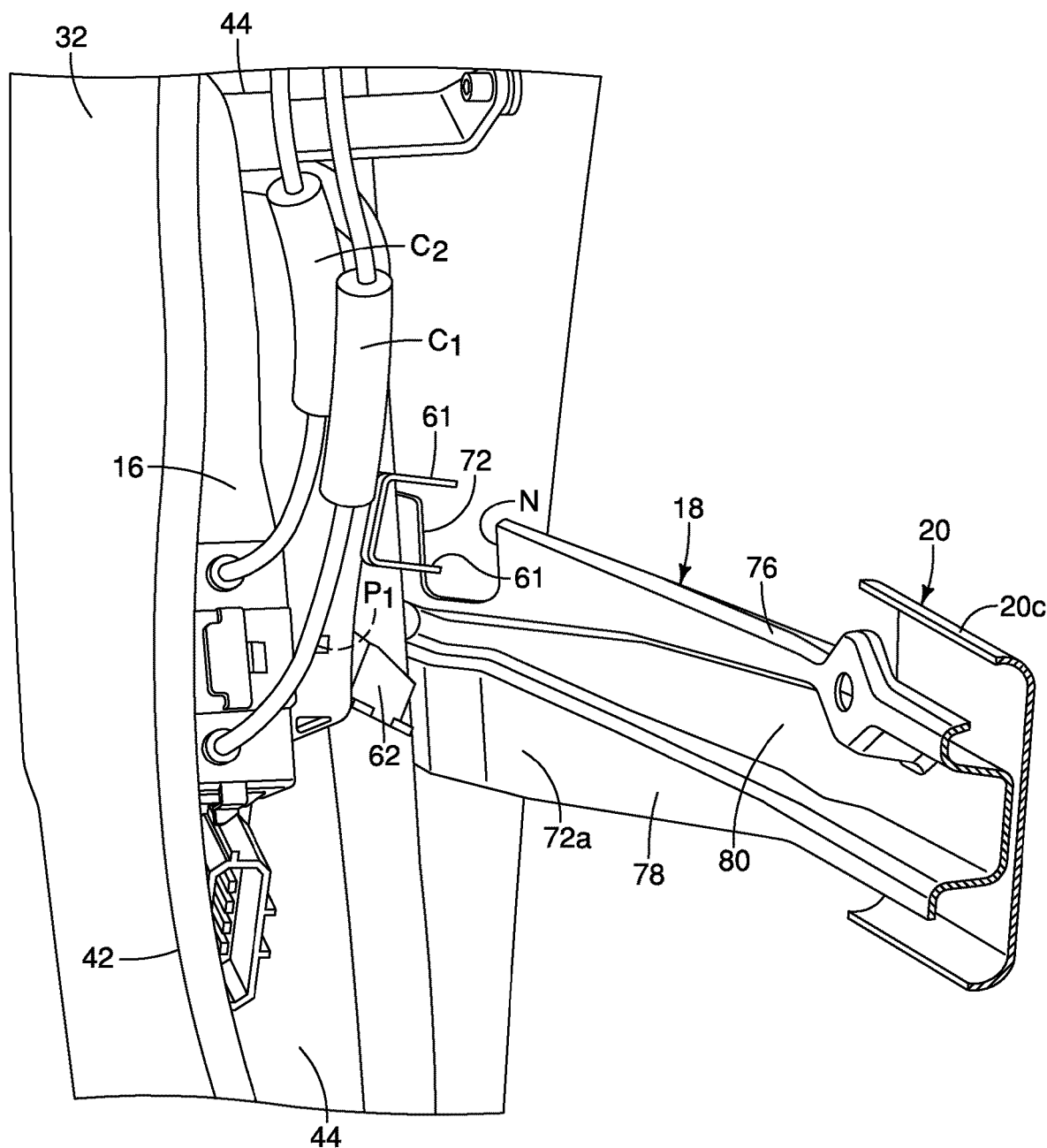
FIG. 5 is a rearward looking cross-sectional view showing the latch mechanism, an operation lever of the latch mechanism in a latching orientation and the reinforcement member in accordance with the first embodiment.
Figure 6:
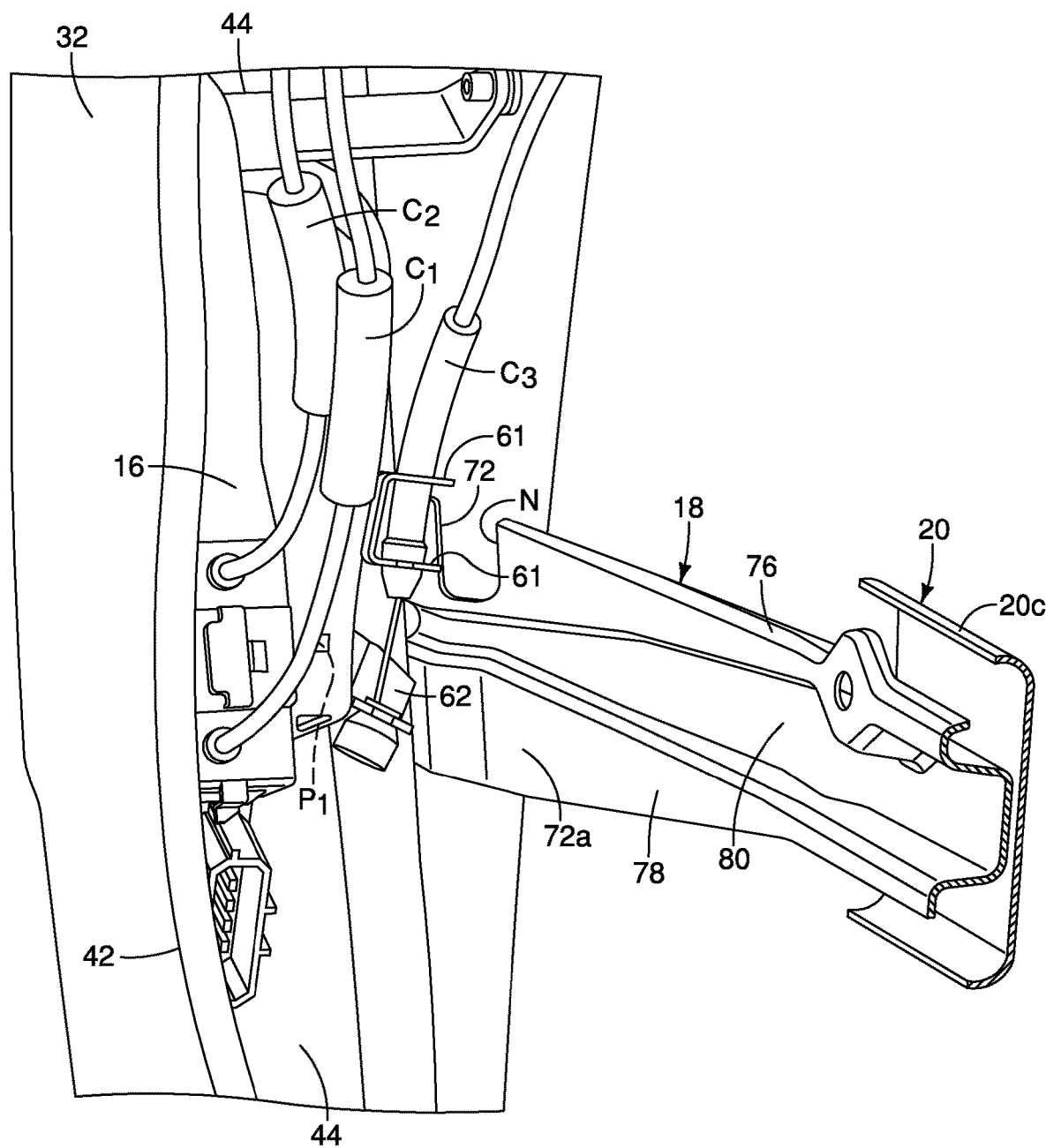
FIG. 6 is another rearward looking cross-sectional view showing the latch mechanism, the operation lever attached to a cable and the reinforcement member in accordance with the first embodiment.
Figure 7:
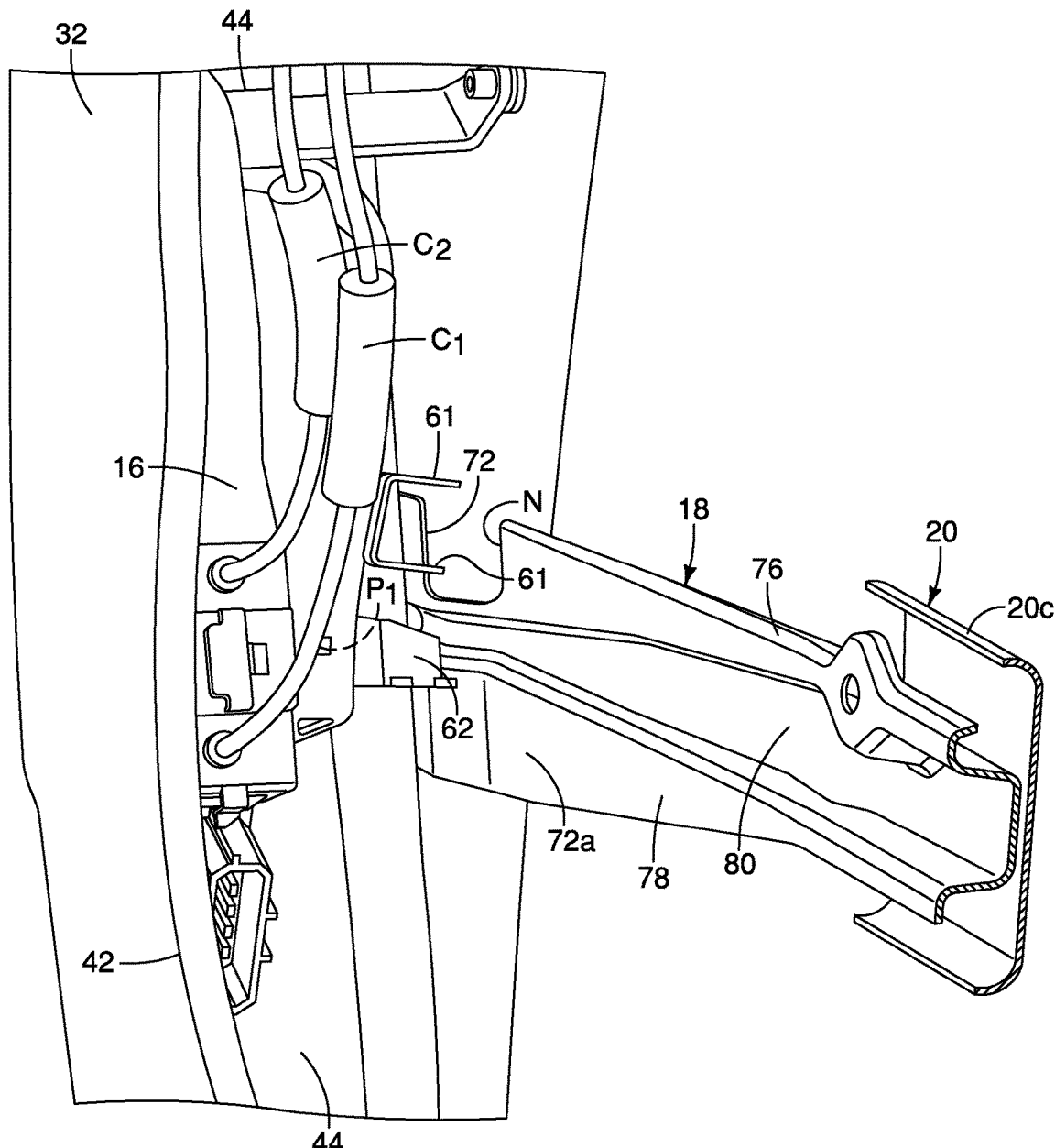
FIG. 7 is yet another rearward looking cross-sectional view showing the latch mechanism, the operation lever in the door open orientation and the reinforcement member with the cable removed in accordance with the first embodiment.

As shown in FIGS. 4-6, the latch mechanism 16 is operably connected via cables $C_1$ and $C_2$ to an interior latch handle 58. As shown in FIGS. 1 and 6, the latch mechanism 16 is operably connected to an exterior latch handle 60 via a cable $C_3$. As shown in FIGS. 5-7, the housing of the latch mechanism 16 includes two parallel brackets 61. As shown in FIG. 6, the brackets 61 are configured to receive portions of the cable $C_3$ such that the cable $C_3$ is retained between the brackets 61. The cable $C_3$ is removed in FIGS. 5 and 7 for clarity. When either one of the interior latch handle 58 or the exterior latch handle is pulled, movement of a wire within a corresponding one of the cables $C_1$, $C_2$ and $C_3$ causes an operation lever 62 to pivot upward from a latched position shown in FIGS. 5 and 6 to the position in FIG. 7 about a pivot shaft $P_1$. When the operation lever 62 is in the latched position shown in FIG. 6, the latch mechanism 16 (and the latch plate 54) is such that the door 14 is retained in the closed orientation. When the operation lever 62 is pulled upward by the cable $C_3$ to the position shown in FIG. 7, the latch mechanism 16 (and the latch plate 54) is such that the door 14 can move freely to the open orientation.

In other words, the operation lever 62 is operably connected to the latch handles 58 and 60 such that with each the latch handles 58 and 60 in an at rest orientation the latch mechanism 16 can remain in the latching orientation if already in the latching orientation. With either one of the latch handles 58 and 60 moved to a door opening orientation the operation lever 62 is moved upward as shown in FIG. 7 causing the latch mechanism 16 to move to the open orientation allowing the door 14 to open. In FIGS. 5 and 7, the cable $C_3$ is removed for the sake of clarity.

The latch mechanism 16 is installed to the rearward portion 44 of the inner panel 32 within the recessed area 46 of the door 14 such that the operation lever 62 extends in an outboard direction toward the reinforcement member 18, as shown in FIGS. 5, 6 and 7. Operation and function of door latch mechanisms such as the latch mechanism 16 are conventional and well known in the art. Therefore, further description of the latch mechanism 16 is omitted for the sake of brevity.

The reinforcement member 18 (FIGS. 3-11) of the door 14 has a forward end 70, a rearward end 72, a central area 74 and the attenuation member 20 (also referred to as the secondary reinforcement portion 20). The forward end 70 is fixedly attached to the forward portion 40 of the inner panel 32 by mechanical fasteners (not shown) or welding techniques. The rearward end 72 is fixedly attached to the rearward portion 44 of the inner panel 32 by mechanical fasteners (not shown) or welding techniques.

A portion 72a of the rearward end 72 covers a section of the latch mechanism 16 adjacent to the rearward portion 44 of the inner panel 32. More specifically, the section of the latch mechanism 16 that includes the operation lever 62 is covered by the portion 72a of the rearward end 72 of the reinforcement member 18. In other words, the operation lever 62 of the latch mechanism 16 is positioned such that at least the portion 72a of the rearward portion 72 of the reinforcement member 18 is outboard and level with the operation lever 62 of the latch mechanism 16. As shown in FIGS. 6 and 7, in a normal state (with no deformation of the door 14) the operation lever 62 is free to move back and forth between the two different positions of the lever 62 shown in FIGS. 6 and 7.

As shown in FIGS. 10 and 11 in cross-section, the central area 74 of the reinforcement member 18 has a serpentine-like shape in cross-section that defines an upper flange portion 76, a lower flange portion 78 and a central portion that defines a recessed area 80 that extends along an inboard side 18a (also referred to as an inboard surface 18a) thereof between the upper flange portion 76 and the lower flange portion 78.

The upper flange portion 76 has a C-shape as viewed in cross-section. Similarly, the lower flange portion 78 also has a C-shape as viewed in cross-section in FIGS. 10 and 11. The lower part of the upper flange portion 76 is continuous with the central portion that defines the recessed area 80 and the upper part of the lower flange portion 78 are continuous with the central portion that defines the recessed area 80.

Figure 8:
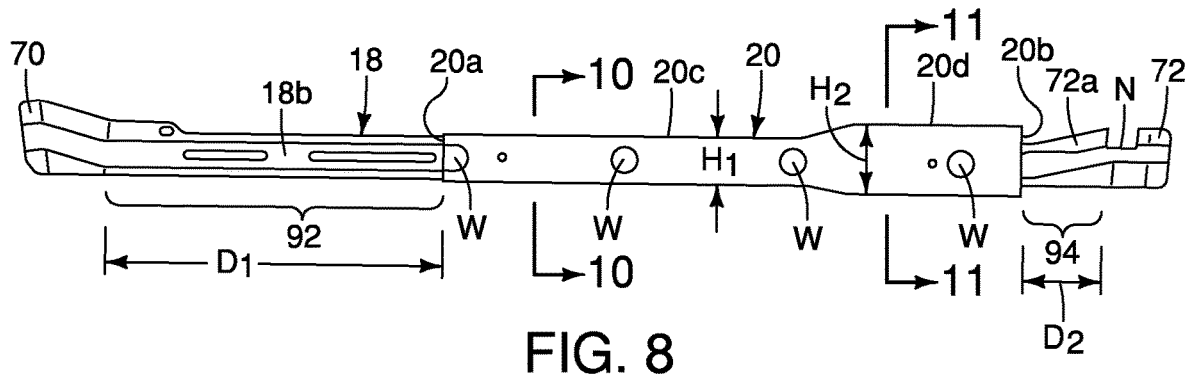
FIG. 8 is a side view of the reinforcement member and a secondary reinforcement member (an attenuation member) shown removed from the door in accordance with the first embodiment.

An inboard surface of the secondary reinforcement portion 20 (the attenuation member 20) is welded via welds W to the outboard surface 18b of the reinforcement member 18 along an area that defines the recessed area 80. As shown in FIGS. 3 and 8, the secondary reinforcement portion 20 is spot welded to the reinforcement member 18 at four spaced apart locations, each location defining the welds W.

The positioning of the attenuation member 20 is determined based upon the overall length of the reinforcement member 18 and the deformation characteristics of the reinforcement member 18, and the desired deformation of the reinforcement member 18 in combination of the attenuation member 20 when attached to one another. The reinforcement member 18 defines a forward section 92 that extends from proximate the forward end 70 to a forward end 20a of the attenuation member 20. The reinforcement member 18 also defines a rearward section 94 that extends from proximate a rearward end 20b of the attenuation member 20 to the rearward end 72 of the reinforcement member 18. The forward section 92 is much longer than the rearward section 94. Preferably, the rearward section 94 is very short.

The forward end 70 of the reinforcement member 18 is spaced apart from the forward end 20a of the attenuation member 20 by a first distance $D_1$. The rearward end 72 of the reinforcement member 18 is spaced apart from the rearward end 20b of the attenuation member 20 by a second distance $D_2$. As shown in FIGS. 3-4 and 8-9, the first distance $D_1$ is significantly greater than the distance $D_2$. Correspondingly, the forward section 92 of the reinforcement member 18 is significantly longer than the rearward section 94 of the reinforcement member 18. The central area 74 of the reinforcement member 18 is covered by the attenuation member 20 in FIG. 8.

The rearward end 72 of the reinforcement member 18 includes notch N. The notch N is aligned with the parallel brackets 61 that retain the cable $C_3$. During an impact event (described below) if the reinforcement member 18 is deformed, the rearward end 72 can deform and move toward the latch mechanism 16. As the deformation of the reinforcement member 18 continues and the reinforcement member 18 is moved toward the latch mechanism 16, the notch N is located to avoid contact with the parallel brackets 61. Consequently, the reinforcement member has limited or no contact with the cable $C_3$.

The attenuation member 20 has a forward section 20c and a rearward section 20d. As shown in FIGS. 10 and 11, each of the forward section 20c and the rearward section 20d has a C-shape or U-shape when viewed in cross-section. Specifically, each has an upper horizontally oriented flange 20e, an upright main section 20f and a lower horizontally oriented flange 20g that together define the C-shape or U-shape. As shown in FIGS. 4, 8 and 10-11, the forward section 20c has a first width $H_1$. The rearward section 20d has a second width $H_2$ that is larger than the first width $H_1$. The larger second width $H_2$ is provided to allow for ease of installation of the attenuation member 20 to the reinforcement member 18 due to projecting areas formed on the reinforcement member 18. Further, the attenuation member 20 is shaped such that it is universal with regard to use on a driver's side door and a passenger's side door. In other words, the attenuation member 20 can be welded to the reinforcement member used on the driver's side door of the vehicle 10 or can be used on the passenger's side door of the vehicle 10 without alteration or modification.

Figure 12:
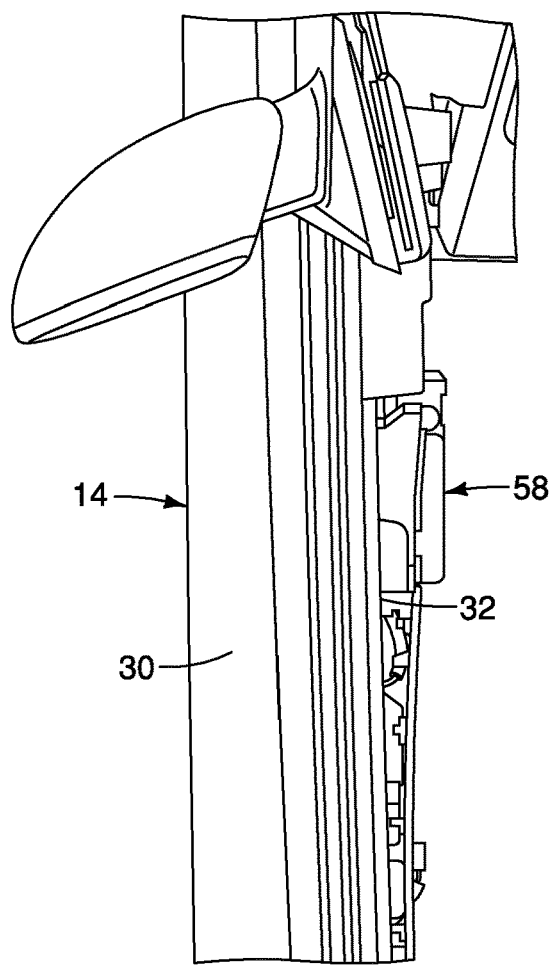
FIG. 12 is a top view of the door with an interior latch handle installed to an interior surface of the door and operably connected to the latch mechanism showing the door in an at rest state (factory state) in accordance with the first embodiment.
Figure 13:
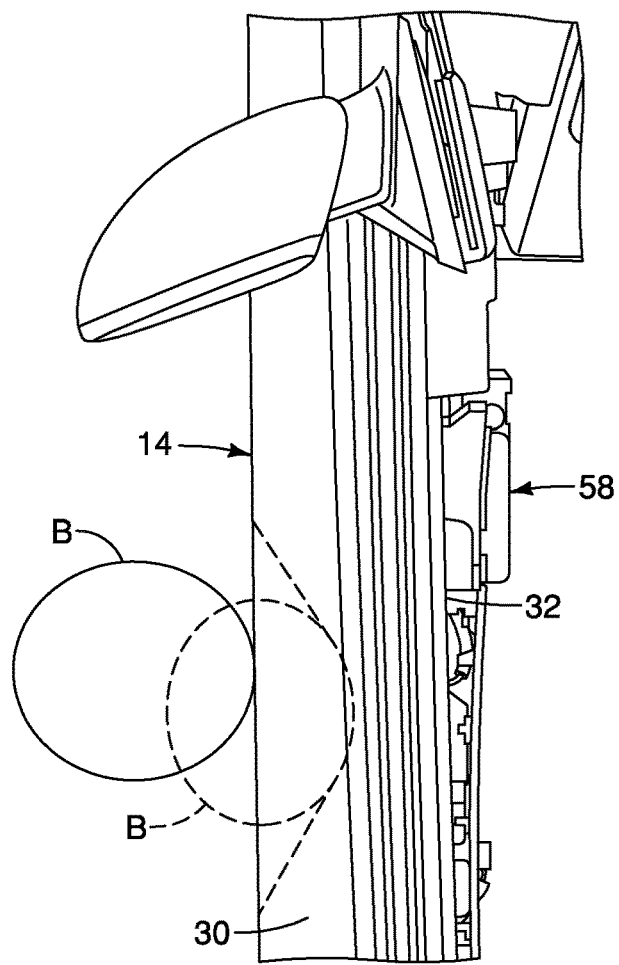
FIG. 13 is another top view of a barrier applying an impact force against the outer panel of the door during an impact event in accordance with the first embodiment.

FIGS. 12 and 13 show the door 14 in two different states. In FIG. 12, the door 14 is shown in a non-impacted or normal state (from the factory state) with the door 14 in a closed orientation. FIG. 13 shows the door 14 with a barrier B that represents an impact force being applied to the door 14 in a representation of an impact event where the barrier B contacts the door 14 proximate a central area of the door 14 deforming that area of the door 14. Deformation of the door 14 is shown as a dashed line or phantom. When the barrier B is in the position relative to the door 14 as shown in phantom lines in FIG. 13, the door 14 deforms in response to the impact event as indicated in the phantom lines.

In response to the impact event where force is directed to a central area of the door 14 (the door structure 14), the impact forces can sometimes cause the interior latch handle 58 or the exterior latch handle 60 to open the door 14. In order to prevent the door 14 from opening during such an impact event, the reinforcement member 18 and the attenuating member 20 are designed to prevent the latch mechanism 16 from releasing the door 14 from the latch striker 26, as described below.

As described above, the operation lever 62 is a trigger for operating the latch mechanism 16 to release the door 14 from the door closed orientation (FIG. 1) and to the door opened orientation (FIG. 2). Operation of either the exterior latch handle 60 or the interior latch handle 58 pulls the operation lever 62 upward, as shown in FIG. 7. During the impact event, as the door 14 is impacted by the barrier B, force is received along an outboard side 18b of the reinforcement member 18. As a result, the reinforcement member 18 deforms and contacts the lever 62 of the latch mechanism 16 retaining the latch mechanism 16 in the latching orientation and preventing the lever 62 in the door closed orientation, as shown in the timed sequence of images depicted in FIGS. 14-17.

Specifically, FIGS. 3 and 4 show the reinforcement member 18 in a non-deformed state (an at rest state or normal state). As shown in FIG. 12, when the door 14 is moved to impact the barrier B (or the barrier B is moved to impact the door 14), the barrier B is provided with sufficient mass and is in a position to deform the door 14. As shown in FIG. 13, relative movement of the barrier B into the door 14 as represented by movement of the barrier B from the solid line position to the phantom line position clearly indicates that the door 14 and the reinforcement member 18 will undergo some deformation moving the central area of the door 14 and the central area 74 in the inboard $D_1$ direction relative to the vehicle 10. As long as the door 14 remains in the closed orientation with the latch mechanism 16 gripping the latch striker 16, at least a portion of the impacting force is absorbed by the B-pillar of the vehicle 10.

Figure 14:
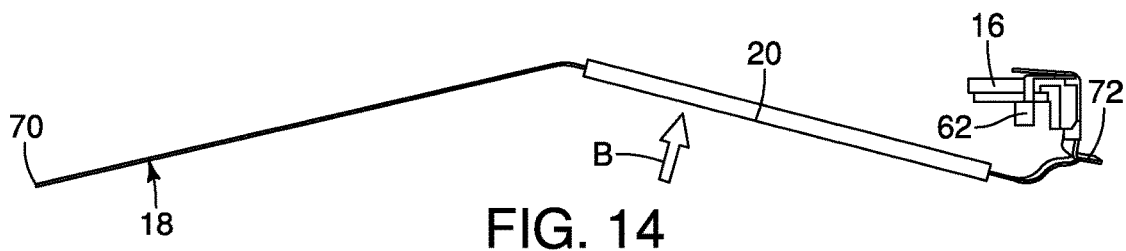
FIG. 14 is a top view of the reinforcement member, the attenuation member and the latch mechanism with other elements of the door removed showing deformation of the reinforcement member at 15-25 ms (milli-seconds) after the start of an impact event in accordance with the first embodiment.
Figure 15:
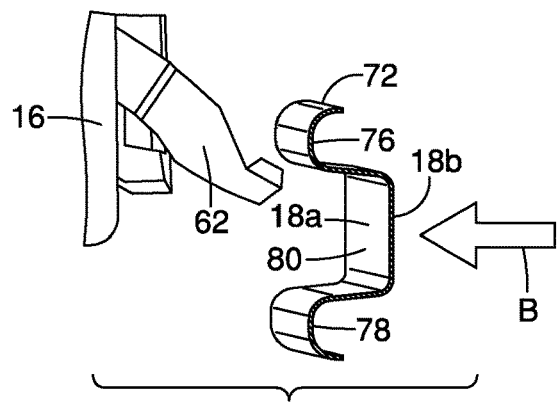
FIG. 15 is a front cross-sectional view of the latch mechanism, the lever of the latch mechanism and a rearward portion of the reinforcement member at 15-25 ms after the start of the impact event showing deformation of the reinforcement member corresponding to the deformation depicted in FIG. 14 in accordance with the first embodiment.

FIGS. 14 and 15 show deformation of the reinforcement member 18 at 15 ms (milli-seconds) after the barrier B first impacts the door 14 and begins to deform the door 14 and the reinforcement member 18. FIG. 14 shows that the central area of the reinforcement member 18 corresponding to the location of the attenuation 20 does not deform, but rather stays straight. The forward section 92 and the rearward sections 94 have bent at their respective ends such that a rearmost area of the reinforcement member 18 at the rearward end 72 bends in an inboard direction.

Figure 16:
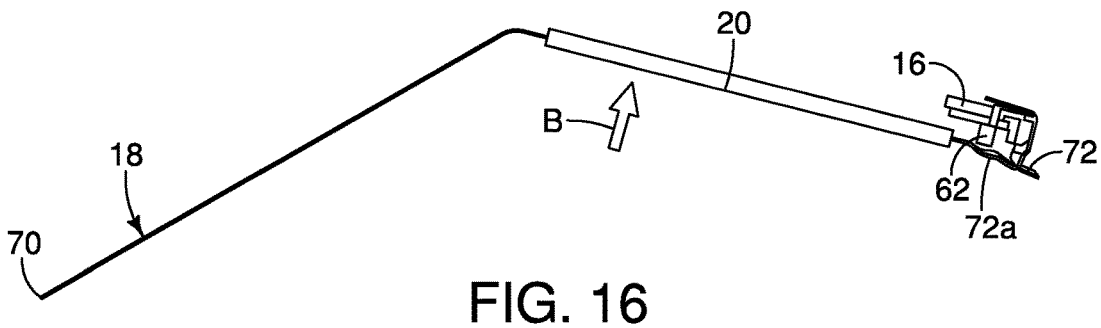
FIG. 16 is another top view of the reinforcement member and the latch mechanism similar to FIG. 14 showing deformation of the reinforcement member at 50 ms (milli-seconds) after the start of the impact event in accordance with the first embodiment.
Figure 17:
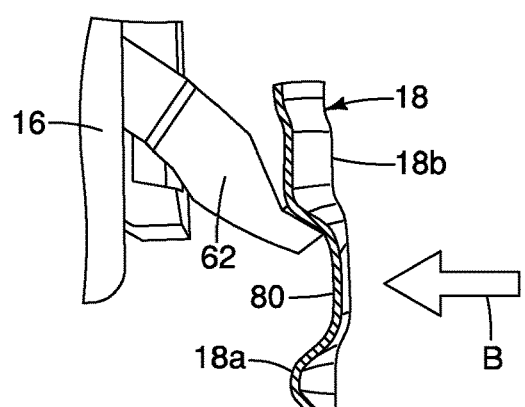
FIG. 17 is another front cross-sectional view of the latch mechanism, the lever of the latch mechanism and the rearward portion of the reinforcement member at 50 ms after the start of the impact event showing deformation of the reinforcement member corresponding to the deformation depicted in FIG. 16 with the reinforcement member moved to a location that prevents operation of the operation lever of the latch mechanism in accordance with the first embodiment.

Similarly, FIGS. 16 and 17 show the deformation of the reinforcement member 18 at 50 ms. The impact force of the barrier B contacting the door 14 is such that the reinforcement member 18 firmly contacts the lever 62 preventing the latch mechanism 16 from operating, thereby keeping the door 14 in the closed orientation. The reinforcement member 18 basically traps and confines the lever 62 within the recessed area 80 preventing the lever 62 from moving within 50 ms from the start of the impact event. Consequently, even if one of the interior latch handle 58 and/or the exterior latch handle 60 is operated, opening of the door 14 is prevented by the rapid movement of the reinforcement member 18 against the lever 62, preventing the lever 62 from moving.

Although not shown in FIG. 16, the depicted deformation moves the area of the reinforcement member 18 such that the brackets 61 are positioned within the notch N proximate the rearward end 72 of the reinforcement member 18.

Further, the latch mechanism 16 is engaged with the latch striker 26 on the B-pillar of the vehicle 10, thereby enabling the B-pillar to absorb a significant amount of the impacting force.

The presence of the attenuation member 20 (the secondary reinforcement portion 20) on the reinforcement member 18 makes the above described deformation possible in less than 50 ms. Specifically, with the attenuation member 20 welded to the central area 74 of the reinforcement member 18, the reinforcement member 18 can deform such that there is contact between the rearward end 72 of the reinforcement member 18 with the lever 62 of the latch mechanism 16. This contact prevents the latch mechanism 16 from operating to open the door 14 even when the interior latch handle 58 is moved to open the door 14. Tests conducted by the inventors show that in the absence of the attenuation member 20, such deformation of the reinforcement member 18 at the rearward end 72 does not necessarily cause contact between the rearward end 72 of the reinforcement member 18 and the lever 62 of the latch mechanism 16 within 50 ms from the beginning of the impact event. Rather, little or no contact is made between the rearward end 72 of the reinforcement member 18 and the lever 62 of the latch mechanism 16 in the absence of the attenuation member.

Depending upon the size of the door 14, the relative size and length of the reinforcement member 18 and the overall design of the vehicle 10, the attenuation member 20 can be lengthened or shortened to achieve a desired deformation of the reinforcement member 18 to prevent operation of the latch mechanism 16 (prevent movement of the lever 62).

As can be ascertained by studying FIGS. 14-17, the inclusion of the attenuation member 20 prevents deformation of the central area 74 of the reinforcement member 18 during an impact event. The basic physics and kinematics of the geometry of the reinforcement member 18 and the attenuation member 20 are such that the presence of the attenuation member 20 increases the bending forces and the amount of deformation (bending) at either end of the reinforcement member 18 because the deformation of the reinforcement member 18 is altered by the inclusion of the attenuation member 20. In other words, the attenuation member 20 prevents or at least reduces the ability of the central area 74 of the reinforcement member 18 to deform (changes its deformation characteristics). Hence, by fine tuning the size, length and strength of the attenuation member 20, the deformation characteristics of the reinforcement member 18 can be fine tune (attenuated) to deform strategically in order to move to a location where there is interference between the reinforcement member 18 an movement of the latch mechanism 16 limiting its ability to open the door 14.

Second Embodiment

Referring now to FIGS. 18-32, a reinforcement member 18' and an attenuation member 20' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

Figure 18:
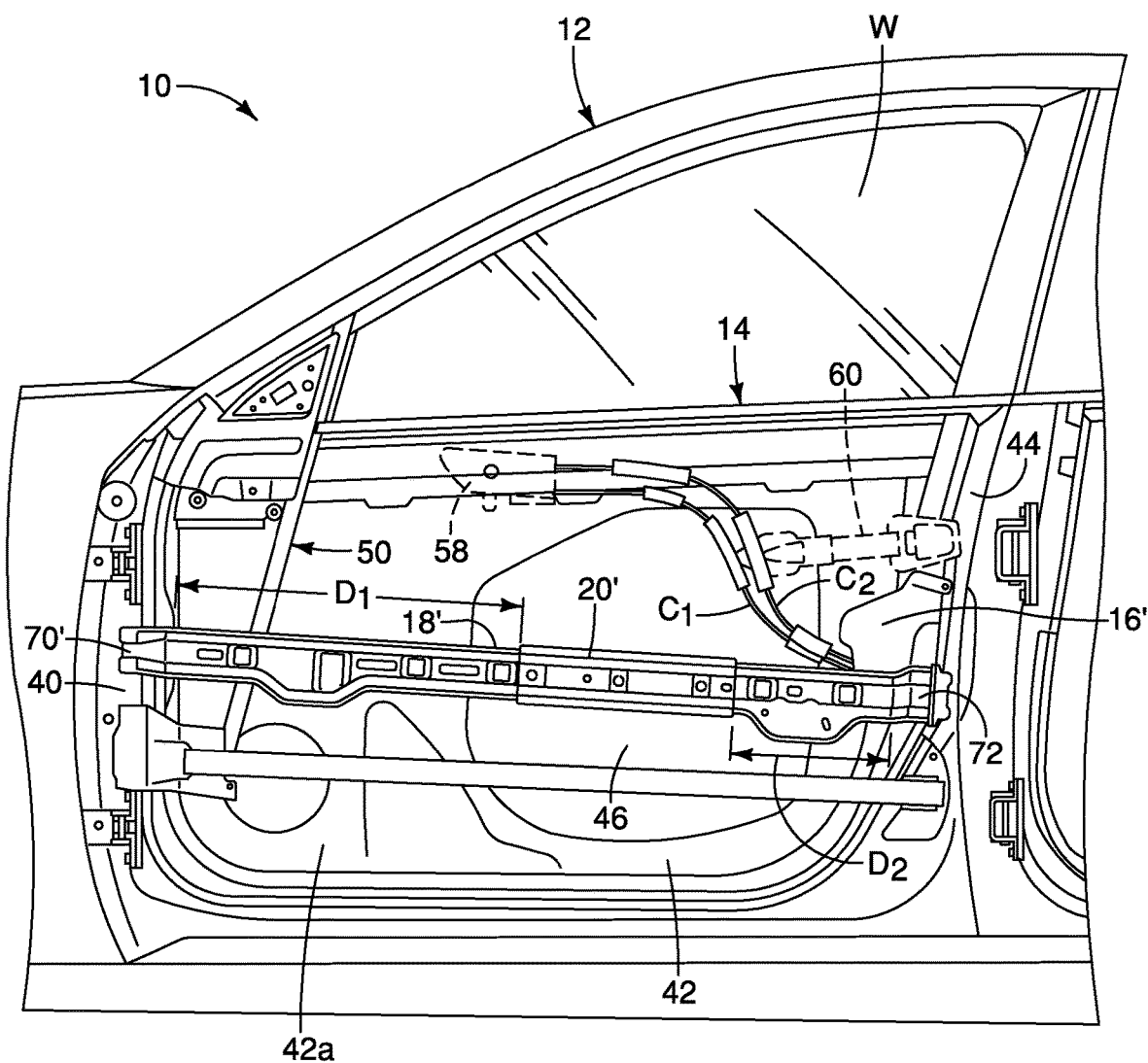
FIG. 18 is a side view of the vehicle with an outer panel of the door structure removed showing a latch mechanism and a reinforcement member in accordance with a second embodiment.
Figure 19:
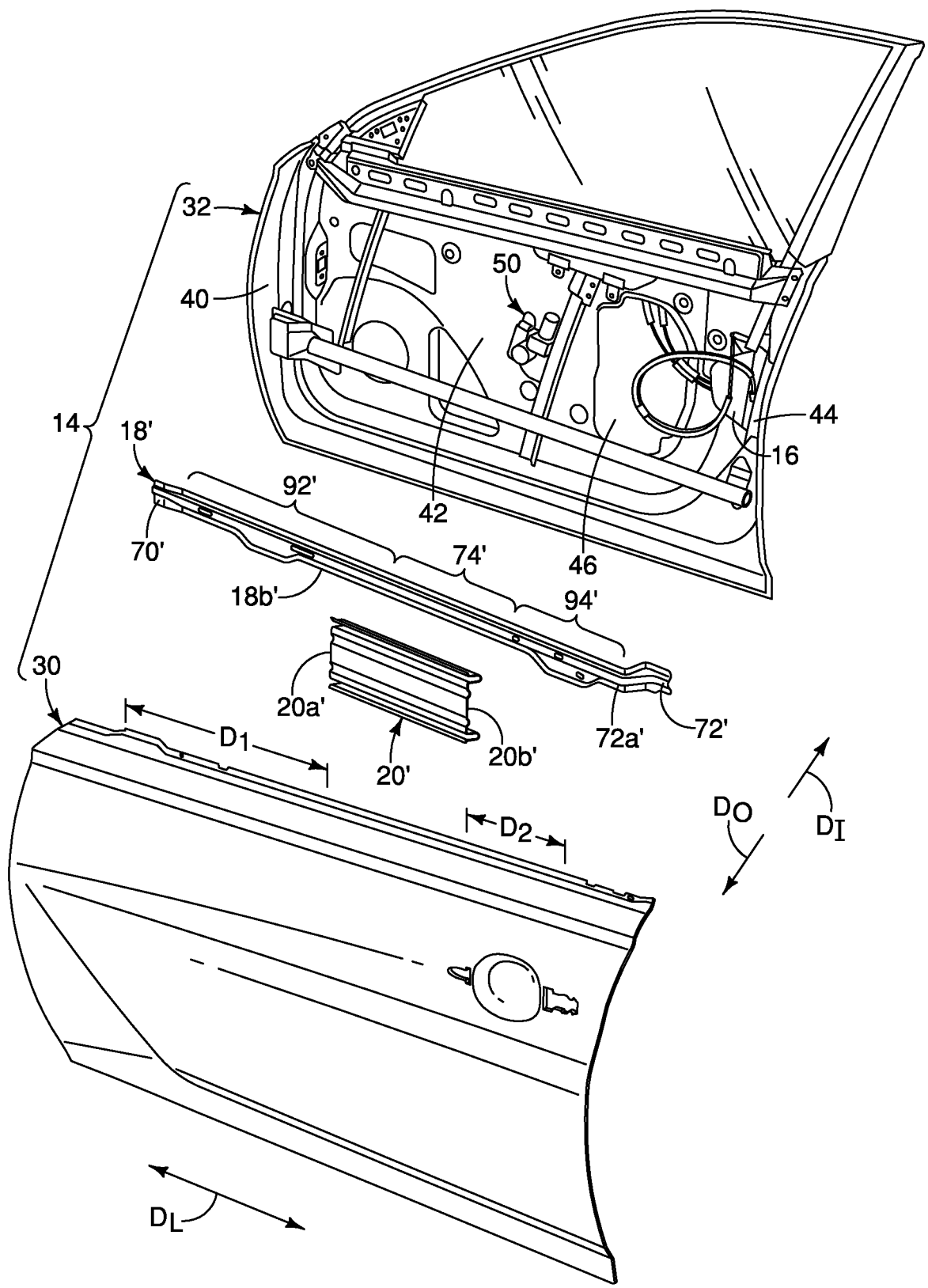
FIG. 19 is an exploded perspective view of the door structure showing the outer panel, an inner panel, the latch mechanism and the reinforcement member in accordance with the second embodiment.

As shown in FIGS. 18 and 19, the door 14 includes basically all of the features and portions described above with respect to the first embodiment, such as the outer panel 30 (FIG. 19), the inner panel 32 and the window regulator 50. Therefore, description of the outer panel 30, the window regulator 50 and the inner panel 32 will be omitted in the second embodiment for the sake of brevity.

In the second embodiment, the door latch mechanism 16 of the first embodiment has been replaced with a door latch mechanism 16'. The door latch mechanism 16' includes a single bracket 61' that retains the cable $C_3$, as shown in FIGS. 20 and 21.

In the second embodiment as shown in FIGS. 18 and 19, the reinforcement member 18 is replaced with the reinforcement member 18', and the secondary reinforcement member of the first embodiment (the attenuation member 20') has been replaced with the secondary reinforcement member 20' (also referred to as the attenuation member 20'). As shown in FIGS. 20 and 21, the single bracket 61' that is located vertically above a rearward end 72' of the reinforcement bracket 18'. Therefore, the notch N of the first embodiment is not necessary in the reinforcement bracket 18' of the second embodiment.

As shown in FIGS. 18 and 19, the latch mechanism 16' is installed to the rearward area 44 of the inner door panel 32 within the recessed area 46 (the hollow interior of the door 14).

Figure 20:
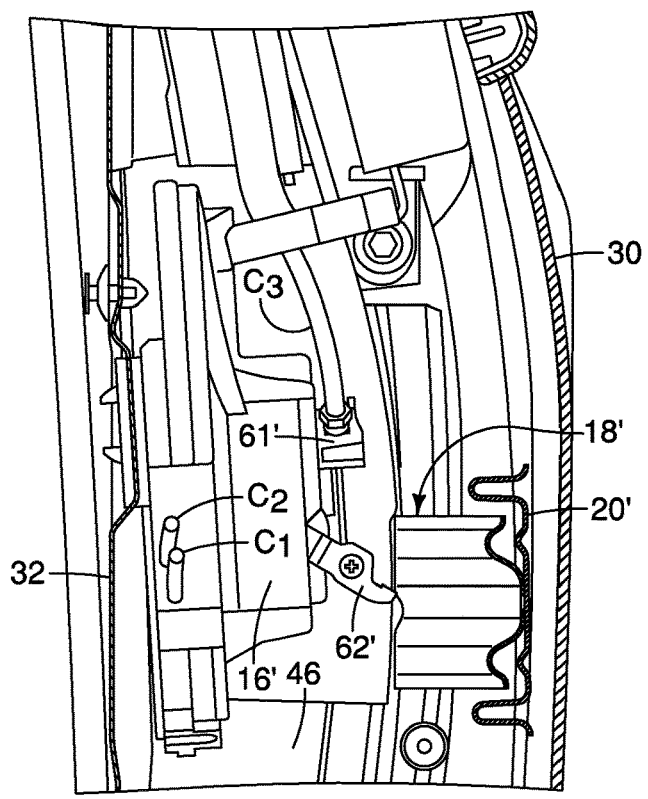
FIG. 20 is a rearward looking cross-sectional view showing the latch mechanism, an operation lever of the latch mechanism in a latching orientation and the reinforcement member in accordance with the second embodiment.
Figure 21:
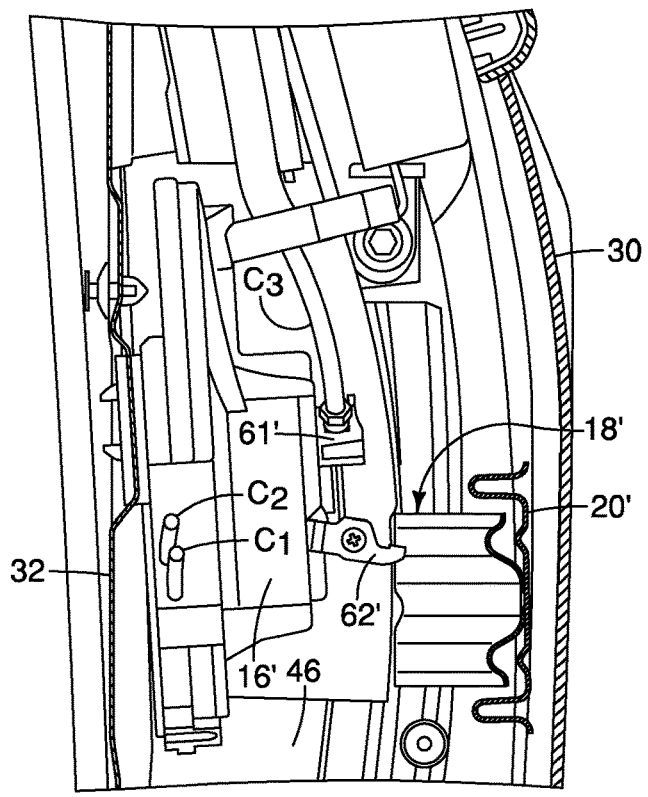
FIG. 21 is another rearward looking cross-sectional view showing the latch mechanism, the operation lever in the door open orientation and the reinforcement member in accordance with the second embodiment.

As shown in FIGS. 20 and 21 (and discussed above with respect the first embodiment), the latch mechanism 16' includes the operation lever 62'. When the operation lever 62' is in an at rest or door closed orientation, as shown in FIG. 20, the latch mechanism 16' can retain the door 14 in the closed orientation. When either the interior latch mechanism 58 or the exterior latch handle 60 is operated, the operation lever 62 pivots upward as shown in FIG. 21 releasing to latch mechanism 16 to that the door 14 can move to the open orientation.

The reinforcement member 18' (FIGS. 18-24 and 27-28) of the door 14 has a forward end 70', a rearward end 72', a central area 74' and the attenuation member 20' (also referred to as the secondary reinforcement member 20'). The forward end 70' is fixedly attached to the forward portion 40 of the inner panel 32 by mechanical fasteners (not shown) or welding techniques. The rearward end 72' is fixedly attached to the rearward portion 44 of the inner panel 32 by mechanical fasteners (not shown) or welding techniques.

A portion 72a' of the rearward end 72' covers a section of the latch mechanism 16 adjacent to the rearward portion 44 of the inner panel 32. More specifically, the section of the latch mechanism 16' includes the operation lever 62'. The operation lever 62' of the latch mechanism 16 is positioned such that at least the portion 72a' of the rearward portion 72' of the reinforcement member 18' is outboard and level with the operation lever 62' of the latch mechanism 16'.

As shown in FIG. 20, in a normal state (with no deformation of the door 14) the operation lever 62' is shown in a door closed orientation. As shown in FIG. 21, the operation lever 62' is shown in a door open orientation. In other words, under normal conditions, in response to operating either one of the interior latch handle 58 and the exterior latch handle 60, the operation lever 62' is free to move back and forth between the two different positions of the lever 62' shown in FIGS. 20 and 21.

As shown in FIGS. 19-21 and 24, the central area 74' of the reinforcement member 18' has a serpentine-like shape in cross-section that defines a recessed area 80' that extends along an inboard surface 18a' of the reinforcement member 18'. The reinforcement member 18' also defines an outboard surface 18b'. The secondary reinforcement member 20' (the attenuation member 20') is fixedly installed to an outboard side 18b' of the reinforcement member 18' along the portion of the outboard surface 18b' corresponding to the recessed area 80'. More specifically, the attenuation member 20' welded to the reinforcement member 18' at welds W shown in FIGS. 22 and 23.

The positioning of the attenuation member 20' is determined based upon the overall length of the reinforcement member 18' and the deformation characteristics of the reinforcement member 18'. The attenuation member 20' is strategically positioned such that the relationships describe below are achieved.

Specifically, in the second embodiment, the reinforcement member 18' defines a forward section 92' (FIGS. 19 and 22) that extends from proximate the forward end 70' of the reinforcement member 18' to a forward end 20a' of the attenuation member 20'. The reinforcement member 18' also defines a rearward section 94' that extends from proximate the rearward end 20b' of the attenuation member 20' to the rearward end 72' of the reinforcement member 18'.

Figure 22:
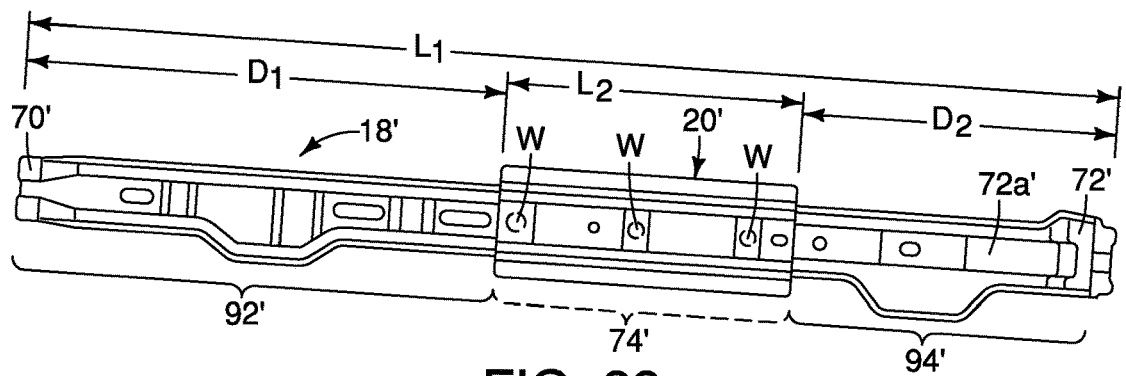
FIG. 22 is a side view of the reinforcement member and a secondary reinforcement member (an attenuation member) shown removed from the door in accordance with the second embodiment.
Figure 23:
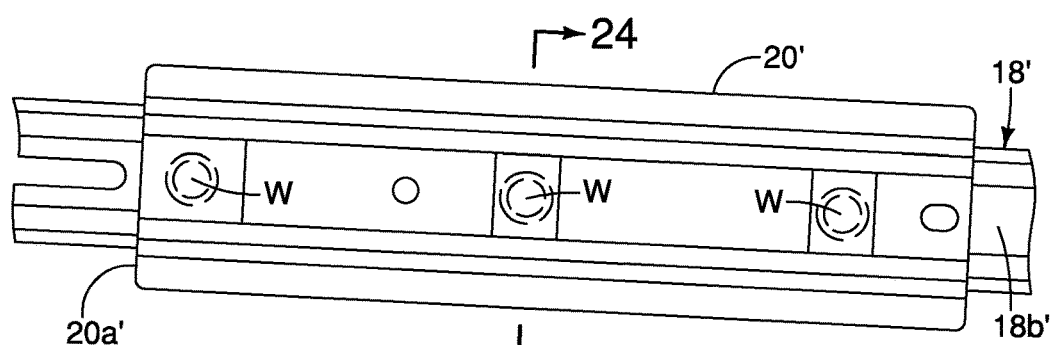
FIG. 23 is a side view of the reinforcement member and the secondary reinforcement member similar to FIG. 22 in accordance with the second embodiment.

The forward end 70' of the reinforcement member 18' is spaced apart from the forward end 20a' of the attenuation member 20' by a first distance $D_1$. The rearward end 72' of the reinforcement member 18' is spaced apart from the rearward end 20b' of the attenuation member 20' by a second distance $D_2$. As shown in FIGS. 19 and 22, the first distance $D_1$ is greater than the distance $D_2$. Correspondingly, the forward section 92' of the reinforcement member 18' is longer than the rearward section 94' of the reinforcement member 18'. Further, the distance $D_1$ of the rearward section 94' is approximately equal to or slightly larger (by about 5%) the length of the attenuation member 20'. It should be noted that the central area 74' of the reinforcement member 18' is defined (and equal to) the length of the attenuation member 20'. The location and length of the attenuation member 20' determines resulting deformation characteristics of the reinforcement member 18' (with the attenuation member 20' attached thereto).

As shown in FIG. 22, the reinforcement member 18' has a first overall length $L_1$ and the attenuation member 20' has a second overall length $L_2$. The second overall length $L_2$ is approximately 25% of the first overall length $L_1$. In other words, the reinforcement member 18' is approximately four times the overall length of the attenuation member 20'.

Figure 24:
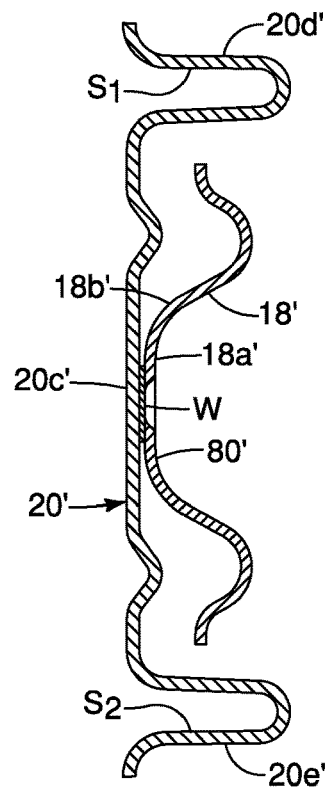
FIG. 24 is a cross-sectional view of the reinforcement member and the secondary reinforcement member taken along the line 24-24 in FIG. 23 showing the shapes of each of the reinforcement member and the secondary reinforcement member in accordance with the second embodiment.

As shown in FIG. 24, the attenuation member 20' (the secondary reinforcement portion 20') has a central section 20c', an upper section 20d' and a lower section 20e' that all extend parallel to one another in the vehicle longitudinal direction DL.

At least a portion of the central section 20c' is generally planar but can include a pair of stiffening ribs. The upper section 20d' has a contoured shape as viewed in cross-section that has an overall U-shape (rotated 90 degrees) with an outboard facing slot $S_1$. Similarly, the lower section 20e' also has a contoured shape as viewed in cross-section that has an overall U-shape (rotated 90 degrees) with an outboard facing slot $S_2$.

Figure 25:
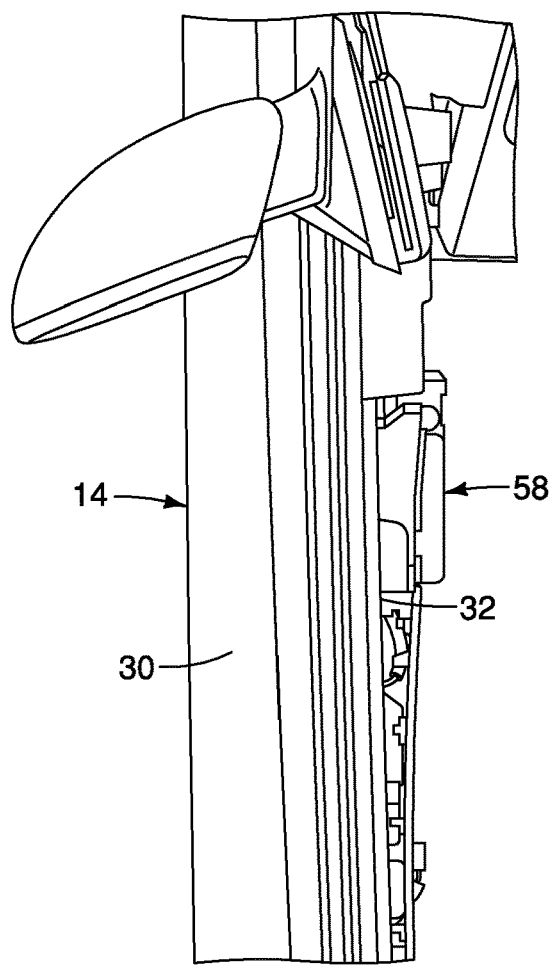
FIG. 25 is a top view of the door with an interior latch handle installed to an interior surface of the door and operably connected to the latch mechanism showing the door in an at rest state (factory state) in accordance with the first embodiment.
Figure 26:
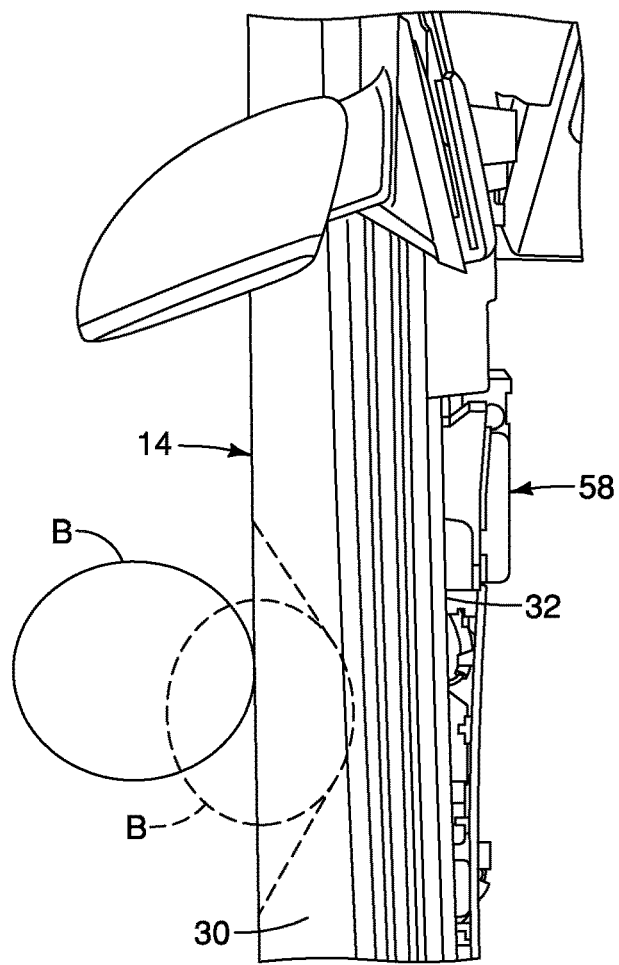
FIG. 26 is another top view of a barrier applying an impact force against the outer panel of the door during an impact event in accordance with the first embodiment.

FIGS. 25 and 26 show the door 14 in two different states. In FIG. 25, the door 14 is shown in a non-impacted or normal state with the door 14 in a closed orientation. In FIG. 26 shows the door 14 with a barrier B that represents an impact force being applied to the door 14 in a representation of an impact event where the barrier B contacts the door 14 proximate a central area of the door 14. When the barrier B is in the position relative to the door 14 as shown in phantom lines, the door 14 has deformed in response to the impact event, as is also shown in phantom lines in FIG. 26.

FIG. 27 shows the reinforcement member 18', the attenuation member 20' and the outer door panel 30 all in an at rest, non-impacted state (from factory). FIG. 28, shows the reinforcement member 18', the attenuation member 20' and the outer door panel 30 during or after an impact event. Specifically, in response to the impact event with the barrier B, the outer door panel 30 deforms and contacts the upper section 20d' and the lower section 20e' of the secondary reinforcement portion 20' covering the outboard facing slots $S_1$ and $S_2$ such that the upper section 20d', the lower section 20e' and the outer door panel 20 define hollow beam sections that increase rigidity of the secondary reinforcement portion 20' during the impact event.

During the impact event, as the door 14 is impacted by the barrier B, force is received along an outboard side 18b' of the reinforcement member 18'. As a result, the reinforcement member 18' deforms and contacts the lever 62 of the latch mechanism 16 retaining the latch mechanism 16 in the latching orientation, as shown in the timed sequence of images depicted in FIGS. 29-32.

Figure 29:
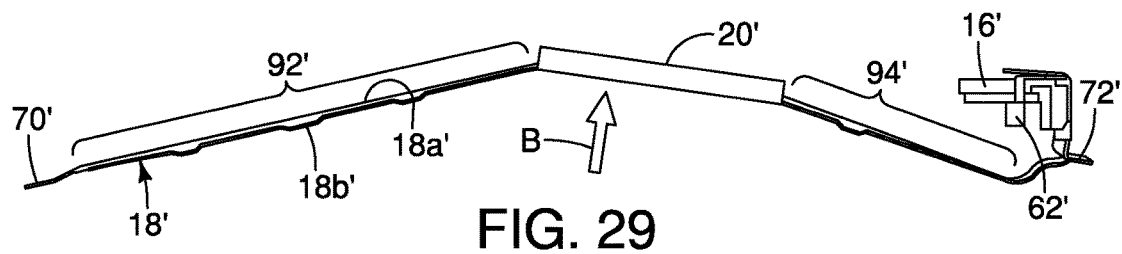
FIG. 29 is a top view of the reinforcement member, the attenuation member and the latch mechanism with other elements of the door removed showing deformation of the reinforcement member at 15-25 ms (milli-seconds) after the start of an impact event in accordance with the second embodiment.
Figure 30:
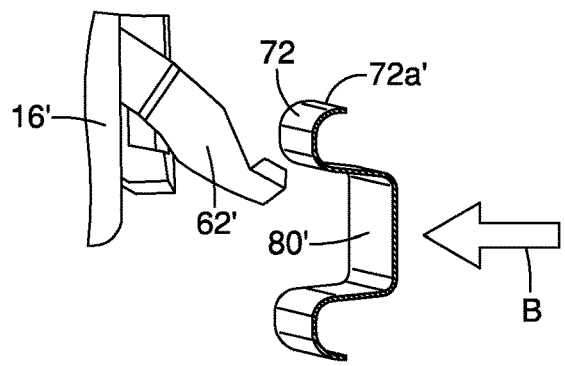
FIG. 30 is a front cross-sectional view of the latch mechanism, the lever of the latch mechanism and a rearward portion of the reinforcement member at 15-25 ms after the start of the impact event showing deformation of the reinforcement member corresponding to the deformation depicted in FIG. 29 in accordance with the second embodiment.

FIGS. 29 and 30 show deformation the reinforcement member 18' 15-20 ms (milli-seconds) after the barrier B first impacts the door 14 and begins to deform the door 14 and the reinforcement member 18'. FIG. 29 shows that the central area 74' of the reinforcement member 18' corresponding to the location of the attenuation 20' does not deform, but rather stays straight. Respective ends of the forward section 92' and the rearward sections 94' have bent such that a rearmost area of the reinforcement member 18' at the rearward end 72' of the reinforcement member 18' bends in an inboard direction. In FIG. 30, the portion 72a' of the reinforcement member 18' has moved toward the operation lever 62'.

Figure 31:
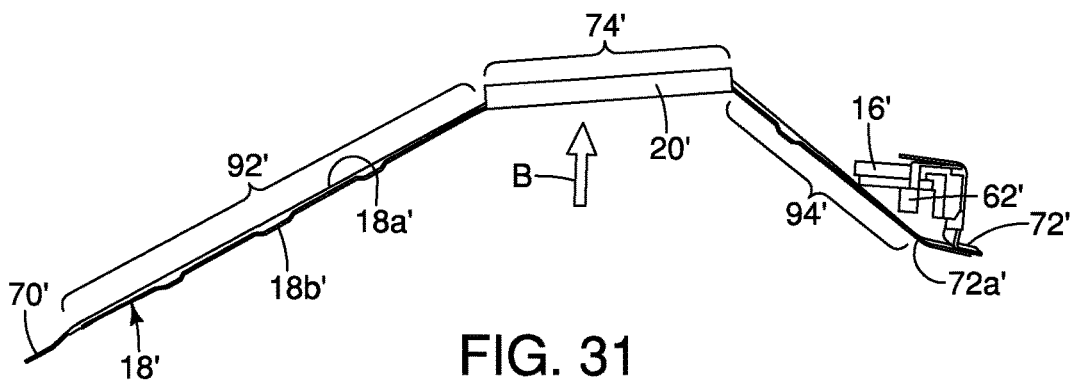
FIG. 31 is another top view of the reinforcement member and the latch mechanism similar to FIG. 29 showing deformation of the reinforcement member at 50 ms (milli-seconds) after the start of the impact event in accordance with the second embodiment.
Figure 32:
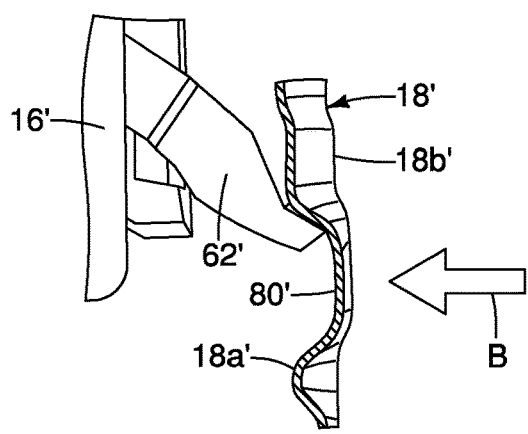
FIG. 32 is another front cross-sectional view of the latch mechanism, the lever of the latch mechanism and the rearward portion of the reinforcement member at 50 ms after the start of the impact event showing deformation of the reinforcement member corresponding to the deformation depicted in FIG. 31 with the reinforcement member moved to a location that prevents operation of the operation lever of the latch mechanism in accordance with the second embodiment.

FIGS. 31 and 32, show the deformation of the reinforcement member 18' at 50 ms (milli-seconds) after the barrier B first impacts the door 14. Both FIGS. 31 and 32 shown that the rearward section 94' has undergone even further movement such that the rearmost area of the reinforcement member 18' at the rearward end 72' has bent further in the inboard direction and is now in firm contact with the lever 62'.

Hence, in less than 50 ms, the impact force of the barrier B contacting the door 14 is such that the reinforcement member 18' firmly contacts the lever 62' preventing the latch mechanism 16' from operating, thereby keeping the door 14 in the closed orientation. The reinforcement member 18' basically traps and confines the lever 62' preventing it from moving within 50 ms from the start of the impact event.

As is further shown in FIGS. 29 and 31, the central area 74' of the reinforcement member 18' and the attenuation member 20' undergoes little or no deformation as compared to deformation of the forward and rearward sections 92' and 94' of the reinforcement member 18' due to rigidity of the secondary reinforcement portion 20' (the attenuation member 20').

As is further demonstrated in FIGS. 29 and 31, the forward section 92' and the rearward section 94' of the reinforcement member 18' have a first level of rigidity and a central section 74' (with the attenuation member 20') have a second level of rigidity that is more resistant to deformation then the first level of rigidity.

Further, after the impact event, the latch mechanism 16' remains engaged with the latch striker 26 on the B-pillar of the vehicle 10, thereby enabling the B-pillar to absorb a significant amount of the impacting forces from the impact event.

Depending upon the size of the door 14, the relative size and length of the reinforcement member 18' and the overall design of the vehicle 10, the attenuation member 20' can be lengthened or shortened to achieve a desired deformation of the reinforcement member 18' to prevent operation of the latch mechanism 16 (prevent movement of the lever 62).

Third Embodiment

Figure 33:
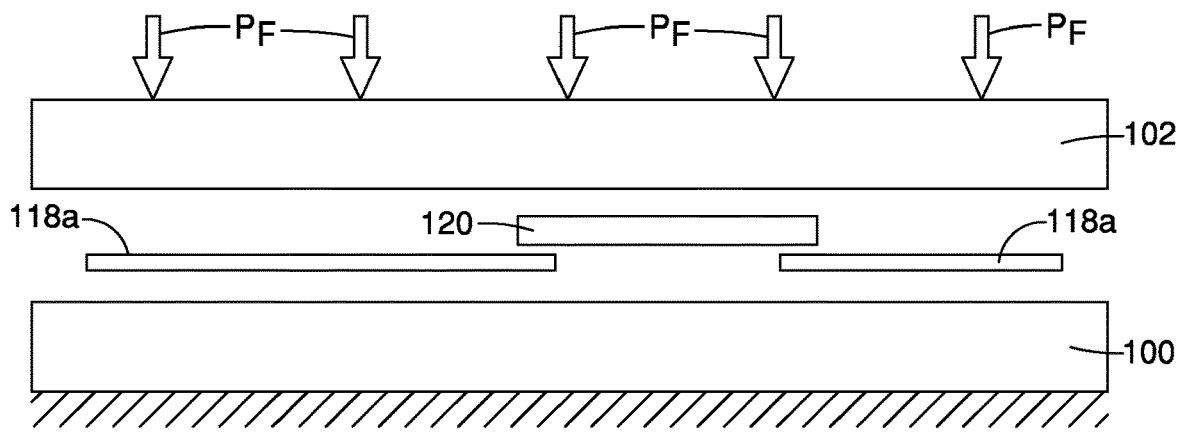
FIG. 33 is a side view of a press and elements prior to pressing and welding the elements that subsequently form a reinforcement member with an attenuation portion in accordance with a third embodiment.
Figure 34:
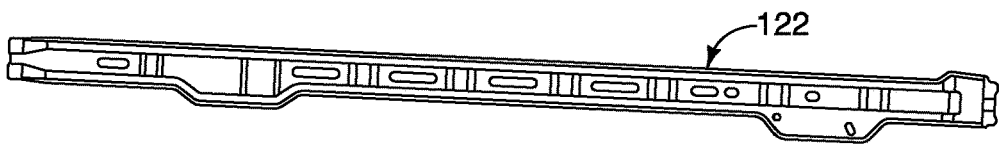
FIG. 34 is a side view of the reinforcement member formed using the press depicted in FIG. 33 in accordance with the third embodiment.

Referring now to FIGS. 33 and 34, a reinforcement member 122 and a method of manufacturing the reinforcement member 122 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the first and second embodiments, the reinforcement members 18 and 18' include a separate attenuation member 20 or 20' (secondary reinforcement portion 20 or 20'). In the third embodiment these members are replaced with a single reinforcement member 122 shown in FIG. 34 that is a single member or beam formed from separate elements welded or otherwise rigidly and non-moveable attached to one another.

As shown in FIG. 33 end sections 118a are placed on a lower section of a press 100 spaced apart from one another. An attenuation section 120 placed in a predetermined position such that the attenuation section 120 extends between the end sections 118a and at least partially overlaps corresponding ends of each of the end sections 118a. As shown in FIG. 33, the attenuation section 120 is thicker than the end sections 118a.

Next, an upper section 102 of the press 100 is moved downward onto the end sections 118a and the attenuation section 120. A pressing force $P_F$ is applied to the attenuation section 120 and the end sections 118a welding them together and shaping them. It should be understood from the drawings and the description herein that the attenuation section 120 and the end sections 118a can be welded to one another prior to pressing.

The surfaces of the press 100 and upper section 102 can be provided with contours and rib forming shapes such that when the upper section 102 is brought down onto the attenuation section 120 and the end sections 118a stiffening ribs and appropriate shapes and contours can be pressed thereon. The pressing force $P_F$ is of sufficient magnitude and force applying strength that the attenuation section 120 and the end sections 118a are deformed and shaped together as well as being welded together to form the single reinforcement member 122 shown in FIG. 34.

When installed to the door 14, the reinforcement member 122 demonstrates the same bending and bending resistant characteristic as the reinforcement member 18' of the second embodiment. If the attenuation section 120 is initially provided with a length corresponding to the attenuation member 20, then the resulting reinforcement member can have the same bending and bending resistant characteristics as the reinforcement member 18 of the first embodiment. Specifically, the sections of the reinforcement member 122 formed from the end sections 118a define a forward section and a rearward section of the reinforcement member 122. The attenuation section 120 serves as a secondary reinforcement portion (an attenuation portion). The end sections 118a have a first level of rigidity and the attenuation section 120 has a second level of rigidity that is more resistant to bending and deforming that the first level of rigidity.

Fourth Embodiment

Figure 35:
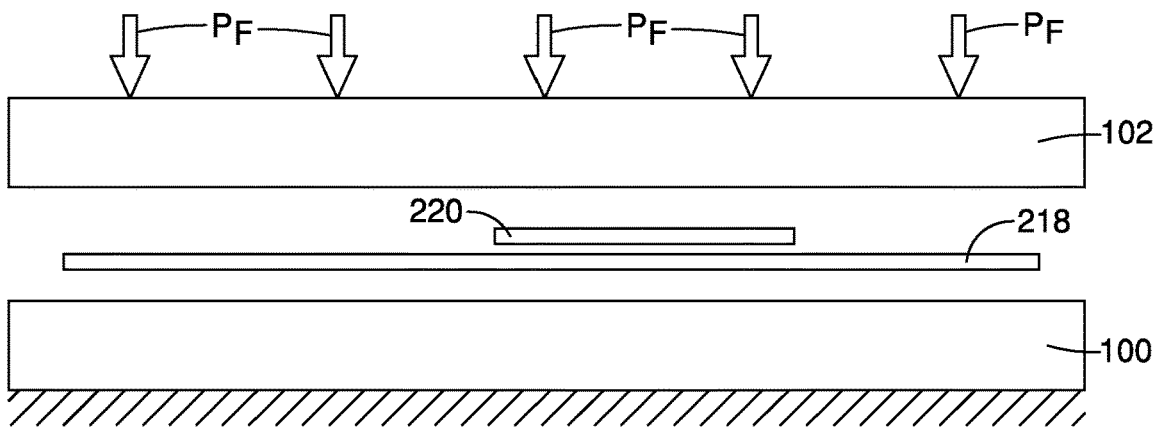
FIG. 35 is a side view of a press and elements prior to pressing and welding the elements that subsequently form a reinforcement member with an attenuation portion in accordance with a fourth embodiment.
Figure 36:
FIG. 36 is a side view of the reinforcement member formed using the press depicted in FIG. 35 in accordance with a fourth embodiment.

Referring now to FIGS. 35 and 36, a reinforcement member 222 and a method of manufacturing the reinforcement member 222 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

As shown in FIG. 35, a main panel 218 is placed on the lower section of the press 100. The main panel 218 is dimensioned such that after pressing it is the length and width of the reinforcement member 222. An attenuation section 220 is placed on top of a central section of the main panel 218 at a predetermined location. As shown in FIG. 35, the attenuation section 120 can be the same thickness as the main panel 218.

Next, an upper section 102 of the press 100 is moved downward onto the main panel 218 and the attenuation section 220. A pressing force $P_F$ is applied to the attenuation section 220 and the main pane 218 welding them together and shaping the two layered pieces. It should be understood from the drawings and the description herein that the attenuation section 220 and the main panel 218 can be welded to one another prior to pressing.

The surfaces of the press 100 and upper section 102 can be provided with contours and rib forming shapes such that when the upper section 102 is brought down onto the attenuation section 220 and the main panel 118 such that stiffening ribs and appropriate shapes and contours can be pressed thereon. The pressing force $P_F$ is of sufficient magnitude and force applying strength that the attenuation section 220 and the main panel 218 are deformed and shaped together as well as being welded together to form the single reinforcement member 222 shown in FIG. 36.

When installed to the door 14, the reinforcement member 222 demonstrates the same bending and bending resistant characteristic as the reinforcement member 18' of the second embodiment. If the attenuation section 220 is initially provided with a length corresponding to the attenuation member 20 of the first embodiment, then the resulting reinforcement member can have the same bending and bending resistant characteristics as the reinforcement member 18 of the first embodiment. Specifically, the sections of the reinforcement member 222 formed from the main panel 118 define a forward section and a rearward section of the reinforcement member 222. The attenuation section 220 serves as a secondary reinforcement portion (an attenuation portion). The main panel 218 has a first level of rigidity. With the attenuation section 220 and the main panel 218 welded and pressed together, they have a second level of rigidity that is more resistant to bending and deforming that the first level of rigidity.

The vehicle 10 includes many features and components that are conventional components that are well known in the art. Since such features and components are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The term "configured" as used herein to describe a component, section or part of a device includes structure is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure, comprising:
   a door structure having an inner door panel and a reinforcement member installed to the inner door panel, the reinforcement member extending from a forward area of the door structure to a rearward area of the door structure, the door structure being movable to and from each of a closed orientation and an open orientation when installed to a vehicle;
   a latch mechanism installed to the rearward area of the inner door panel, the latch mechanism being configured such that in a latching orientation the latch mechanism retains the door structure in the closed orientation and in a release orientation the door structure can move to the open orientation, the latch mechanism being positioned such that at least a section of a rearward portion of the reinforcement member is outboard and level with a portion of the latch mechanism, the latch mechanism includes an operation lever operably connected to a latch handle such that with the latch handle in an at rest orientation the latch mechanism can remain in the latching orientation if already in the latching orientation and with the latch handle moved to a door opening orientation the latch mechanism is moved to the open orientation; and
   a secondary reinforcement portion fixedly attached to a central area of the reinforcement member spaced apart from a forward area of the inner door panel with the secondary reinforcement portion being located along an outboard side of the reinforcement member such that in response to an impact event where force is directed to a central area of the door structure, the reinforcement member deforms and contacts the latch mechanism retaining the latch mechanism in the latching orientation, the secondary reinforcement portion has a forward end and a rearward end, the forward end of the secondary reinforcement portion being spaced apart from the forward end of the reinforcement member by a first distance, and the rearward end of the secondary reinforcement portion is adjacent to the rearward end of the reinforcement member such that in response to an impact event where force is directed to the central area of the door structure, the reinforcement member deforms and contacts the latch mechanism and the operation lever preventing movement of the operation lever to the door opening orientation, and the reinforcement member has a first overall length as measured from the forward area of the door structure to the rearward area of the door structure and the secondary reinforcement portion has a second overall length that is approximately half of the first overall length.

2. The vehicle body structure according to claim 1, wherein
   the secondary reinforcement portion is welded to the reinforcement member at a plurality of locations.

3. The vehicle body structure according to claim 1, wherein
   the secondary reinforcement portion is spot welded to the reinforcement member at a plurality of locations.

4. The vehicle body structure according to claim 1, wherein
   the secondary reinforcement portion is formed as a single member with the reinforcement member.

5. The vehicle body structure according to claim 1, wherein
the reinforcement member has a forward section and a rearward section each having a first level of rigidity and a central section having a second level of rigidity.

6. The vehicle body structure according to claim 1, wherein
the reinforcement member is provided with a second panel overlaying a central area of the reinforcement member with the second panel being pressed and welded to the central area defining a single unitary beam with the second panel and the central area of the reinforcement member defining the secondary reinforcement portion.

7. A vehicle body structure, comprising:
a door structure having an inner door panel and a reinforcement member installed to the inner door panel, the reinforcement member extending from a forward area of the door structure to a rearward area of the door structure, the door structure being movable to and from each of a closed orientation and an open orientation when installed to a vehicle;
a latch mechanism installed to the rearward area of the inner door panel, the latch mechanism being configured such that in a latching orientation the latch mechanism retains the door structure in the closed orientation and in a release orientation the door structure can move to the open orientation, the latch mechanism being positioned such that at least a section of a rearward portion of the reinforcement member is outboard and level with a portion of the latch mechanism; and
a secondary reinforcement portion fixedly attached to a central area of the reinforcement member spaced apart from a forward area of the inner door panel such that in response to an impact event where force is directed to a central area of the door structure, the reinforcement member deforms and contacts the latch mechanism retaining the latch mechanism in the latching orientation, the secondary reinforcement portion having a forward end and a rearward end, the forward end of the secondary reinforcement portion being spaced apart from the forward end of the reinforcement member by a first distance, and the rearward end of the secondary reinforcement portion being spaced apart from the rearward end of the reinforcement member by a second distance, the first distance being greater than the second distance.

8. The vehicle body structure according to claim 7, wherein
the reinforcement member has a first overall length as measured from the forward area of the door structure to the rearward area of the door structure and the secondary reinforcement portion has a second overall length that is approximately a quarter of the first overall length.

9. The vehicle body structure according to claim 7, wherein
the reinforcement member defines a forward section forward of the secondary reinforcement portion, a central area defined along the secondary reinforcement portion and a rearward section rearward of the secondary reinforcement portion, and
in response to an impact event where force is directed to the door structure in an area corresponding to the central area of the reinforcement member, the forward section and the rearward section of the reinforcement member deform and the central area of the reinforcement member undergoes little or no deformation as compared to deformation of the forward and rearward sections of the reinforcement member due to rigidity of the secondary reinforcement portion.

10. The vehicle body structure according to claim 9, wherein
in response to the impact event, the rearward section of the reinforcement member deforms and contacts the latch mechanism retaining the latch mechanism in the latching orientation.

11. The vehicle body structure according to claim 7, wherein
the secondary reinforcement portion is located along an outboard side of the reinforcement member.

12. The vehicle body structure according to claim 7, wherein
the secondary reinforcement portion has a central section, an upper section and a lower section that all extend parallel to one another in a vehicle longitudinal direction, at least a portion of the central section is generally planar, the upper section has a contoured shape as viewed in cross-section that has an overall U-shape with an outboard facing slot and the upper section has a contoured shape as viewed in cross-section that has an overall U-shape with an outboard facing slot.

13. The vehicle body structure according to claim 12, wherein
the door structure further includes an outer door panel that is attached to an outer outboard periphery of the inner door panel, the outer door panel being outboard of and spaced apart from the reinforcement member and the secondary reinforcement portion such that in response to an impact event where impact force is applied to the outer door panel, the outer door pane deforms and contacts the upper section and the lower section of the secondary reinforcement portion covering the outboard facing slots such that the upper section, the lower section and the outer door panel define hollow beam sections that increase rigidity of the secondary reinforcement portion during the impact event.

14. A vehicle body structure, comprising:
a door structure having an inner door panel and a reinforcement member installed to the inner door panel, the reinforcement member extending from a forward area of the door structure to a rearward area of the door structure, the door structure being movable to and from each of a closed orientation and an open orientation when installed to a vehicle;
a latch mechanism installed to the rearward area of the inner door panel, the latch mechanism being configured such that in a latching orientation the latch mechanism retains the door structure in the closed orientation and in a release orientation the door structure can move to the open orientation, the latch mechanism being positioned such that at least a section of a rearward portion of the reinforcement member is outboard and level with a portion of the latch mechanism; and
a secondary reinforcement portion fixedly attached to a central area of the reinforcement member spaced apart from a forward area of the inner door panel such that in response to an impact event where force is directed to a central area of the door structure, the reinforcement member deforms and contacts the latch mechanism retaining the latch mechanism in the latching orientation, the secondary reinforcement portion having a forward section having a first vertically oriented width and a rearward section having a second vertically oriented width that is greater than the first vertically oriented width.

* * * * *